US010106260B2

(12) United States Patent
Gagnon et al.

(10) Patent No.: US 10,106,260 B2
(45) Date of Patent: *Oct. 23, 2018

(54) EXIT ROW TABLE FOR AN AIRCRAFT

(71) Applicant: Bombardier Inc., Dorval (CA)

(72) Inventors: Pierre Gagnon, Vaudreuil (CA); Jordan Roy, Saint-Constant (CA); Tom Deka, Ste-Catherine (CA); Christian Mageau, Saint-Joseph-du-Lac (CA); Michele Monardo, Montreal (CA); Stefan Huber, Ort im Innkreis (AT); Christoph Haselberger, Ort imm Innkreis (AT)

(73) Assignee: BOMBARDIER, INC., Dorval (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/690,745

(22) Filed: Aug. 30, 2017

(65) Prior Publication Data

US 2017/0361934 A1 Dec. 21, 2017

Related U.S. Application Data

(63) Continuation of application No. 14/890,960, filed as application No. PCT/IB2014/000637 on Apr. 29, 2014, now Pat. No. 9,783,303.

(Continued)

(51) Int. Cl.
*B64D 11/06* (2006.01)
(52) U.S. Cl.
CPC .......... *B64D 11/0638* (2014.12); *B64D 11/06* (2013.01); *B64D 11/0605* (2014.12)

(58) Field of Classification Search
CPC ... A47B 5/00; A47B 23/00; A47B 2200/0056; A47B 31/06; A47D 1/008; A47D 1/0081;
(Continued)

(56) References Cited

U.S. PATENT DOCUMENTS 1,201,907 A * 10/1916 Wordy .................... A47C 7/70
297/145
1,726,109 A * 8/1929 Jost ......................... A47C 7/70
297/145
(Continued)

FOREIGN PATENT DOCUMENTS

EP      2213503 A1    8/2010

OTHER PUBLICATIONS

PCT International Search Report and Written Opinion dated Sep. 11, 2014 re: International Application No. PCT/IB2014/000637.

(Continued)

*Primary Examiner* — Jose V Chen
(74) *Attorney, Agent, or Firm* — Norton Rose Fulbright Canada LLP

(57) ABSTRACT

A table (30) for an aircraft includes a table surface (56) deployable between a retracted position and a deployed position, an arm (50) having a first end and a second end, the arm (50) supporting the table (66) surface at the first end, a support connected to the arm (50) at the second end, the support connecting the arm to a structure interior to the aircraft, a sensor (136) within the aircraft to detect if a seat adjacent to the table surface is occupied, and a mechanism (120) for retracting the table surface to the retracted position if the sensor (136) detects at least one of that the seat is not occupied and that the aircraft flight mode meets predetermined criteria.

4 Claims, 22 Drawing Sheets

Related U.S. Application Data

(60) Provisional application No. 61/823,567, filed on May 15, 2013.

(58) Field of Classification Search
CPC .......... A47D 1/0083; A61G 2005/1094; B60N 3/00; B60N 3/004; A47C 7/68; A47C 7/70; B64D 11/0638
USPC ........ 108/145, 152, 45, 44, 20, 42; 297/145, 297/147, 154, 155
See application file for complete search history.

(56) References Cited

U.S. PATENT DOCUMENTS

| | | | |
|---|---|---|---|
| 1,907,322 A * | 5/1933 | Keicher | A47C 7/70 108/33 |
| 2,251,544 A * | 8/1941 | Jiranek | A47C 7/72 297/145 |
| 2,741,300 A * | 4/1956 | Tubbs | A47C 7/70 297/145 |
| 3,583,760 A | 6/1971 | McGregor | |
| 3,632,161 A | 1/1972 | Arfaras | |
| 4,834,449 A | 5/1989 | Engelman | |
| 4,944,552 A | 7/1990 | Harris | |
| 5,547,247 A | 8/1996 | Dixon | |
| 5,547,248 A * | 8/1996 | Marechal | B60N 2/468 248/278.1 |
| 6,273,502 B1 | 8/2001 | Lo | |
| 6,347,590 B1 | 2/2002 | D'Annunzio et al. | |
| 6,598,934 B1 | 7/2003 | Anderson | |
| 7,306,282 B2 | 12/2007 | Salzer et al. | |
| 7,311,354 B2 | 12/2007 | Giasson | |
| 7,506,923 B1 | 3/2009 | Gauss | |
| 7,798,072 B2 | 9/2010 | Becker et al. | |
| 7,874,614 B2 | 1/2011 | Figueras Mitjans | |
| 8,033,229 B1 | 10/2011 | McCanna | |
| 8,065,966 B1 | 11/2011 | Bacon et al. | |
| 8,132,518 B2 | 3/2012 | Kim et al. | |
| 8,267,472 B2 | 9/2012 | Large et al. | |
| 8,276,525 B2 | 10/2012 | Janssen | |
| 8,448,581 B2 | 5/2013 | Hanna et al. | |
| 8,596,206 B2 | 12/2013 | Legeay | |
| 8,672,400 B2 | 3/2014 | Henderson | |
| 9,783,303 B2 * | 10/2017 | Gagnon | B64D 11/0638 |
| 2003/0154890 A1 | 8/2003 | Warner | |
| 2007/0132283 A1 | 6/2007 | Mitjans | |
| 2015/0284089 A1 * | 10/2015 | Gow | B64D 11/0638 297/147 |
| 2015/0289641 A1 | 10/2015 | Ergun et al. | |
| 2015/0321592 A1 * | 11/2015 | De Morais | B64D 11/06 297/147 |
| 2016/0375810 A1 * | 12/2016 | Kong | B60N 3/002 297/145 |

OTHER PUBLICATIONS

United State Patent and Trademark Office, Office Action dated Oct. 27, 2016 re: U.S. Appl. No. 14/890,960.

Norton Rose Fulbright Canada LLP, Response dated Jan. 26, 2017 to Office Action dated Oct. 27, 2016 re: U.S. Appl. No. 14/890,960.

United State Patent and Trademark Office, Office Action dated Feb. 24, 2017 re: U.S. Appl. No. 14/890,960.

Norton Rose Fulbright Canada LLP, Response dated May 23, 2017 to Office Action dated Feb. 24, 2017 re: U.S. Appl. No. 14/890,960.

\* cited by examiner

EXIT ROW TABLE FOR AN AIRCRAFT

CROSS-REFERENCE TO RELATED APPLICATIONS AND CLAIM OF PRIORITY

This application is a continuation of U.S. patent application Ser. No. 14/890,960 filed on Nov. 13, 2015, which is a national stage application under 35 U.S.C. 371 of International Patent Application No. PCT/IB2014/000637 filed on Apr. 29, 2014, which claims priority to U.S. provisional patent application No. 61/823,567 filed on May 15, 2013, the entire contents of which are hereby incorporated by reference.

FIELD OF THE INVENTION

The present invention concerns a construction for a table in an aircraft. Specifically, the present invention concerns a table in an aircraft that is contemplated to be positioned adjacent to an emergency exit, where the table includes features that facilitate egress from the aircraft in the event of an emergency. The present invention also is contemplated to be employed on a smaller aircraft such as a private aircraft or a corporate aircraft, particularly a jet aircraft.

DESCRIPTION OF THE RELATED ART

Passenger seating adjacent to an emergency exit row presents unique engineering challenges when configuring the interior of an aircraft.

As should be apparent to any traveler, in the event of an emergency, it is necessary for the passenger to be provided with access to the emergency exit. This includes access to a doorway or to an emergency exit window. For purposes of the discussion that follows, the term "emergency exit location" is intended to refer to any point of egress from an aircraft, regardless of the mode of egress (i.e., a door or window).

Ensuring access to an emergency egress location may involve any of a number of different design parameters. For example, the aisle providing access to the emergency egress location may be wider than other aisles on board the aircraft.

Separately, it is known that some aircraft designers provide removable tables for passenger seats that are adjacent to an emergency exit location. The removable tables are intended to be separable from the passenger seat. In this design, any person who tries to access the emergency exit location may remove the table from the seat, thereby removing any obstruction that might discourage access to the emergency location.

As should be apparent to those skilled in the art, there are still further design alterations that may be made to assure access to emergency exit locations.

One deficiency that has been identified in the prior art lies in the fact that a side table is not easily provided to a passenger who is seated near to an emergency exit location.

It is in the context of this confluence of factors that the present invention was developed.

SUMMARY OF THE INVENTION

The present invention addresses one or more of the deficiencies noted with respect to the prior art.

In one contemplated embodiment, the present invention provides a table for an aircraft that includes a table surface deployable between a retracted position and a deployed position, an arm having a first end and a second end, the arm supporting the table surface at the first end, a support connected to the arm at the second end, the support connecting the arm to a structure interior to the aircraft, a sensor within the aircraft to detect if a seat adjacent to the table surface is occupied, and a mechanism for retracting the table surface to the retracted position if the sensor detects at least one of that the seat is not occupied and that the aircraft flight mode meets predetermined criteria.

It is contemplated that the mechanism may hold the table surface in a predetermined position if the seat is occupied and also, possibly, if the aircraft flight mode meets predetermined criteria.

It is also contemplated that the exit row table includes a locking mechanism for locking the table surface in a predetermined position between the retracted position and the deployed position if the sensor detects that the seat is occupied and the aircraft flight mode meets predetermined criteria.

The exit row table of the present invention is contemplated to include a table surface that includes at least a first leaf and a second leaf that pivotally connected to one another.

The exit row table of the present invention also may include a table support pivot disposed at the first end of the arm, permitting rotation of the table surface about the table support pivot.

It is also contemplated that the exit row table includes an arm pivot disposed at the second end of the arm, permitting rotation of the arm about the arm pivot.

In one embodiment, the exit row table of the present invention includes an extension disposed at the first end of the arm, permitting the table surface to be moved between the retracted position and the deployed position. The extension may be parallel to the arm. The extension may be disposed at an angle with respect to the arm.

The exit row table is contemplated to be stowable in a sideboard or an arm rest on the aircraft.

With respect to one or more embodiments of the exit row of the present invention, it is contemplated that the sensor is disposed in the seat and detects if a weight on the seat exceeds a predetermined amount.

The retraction mechanism may be at least one of a pneumatic damper, a hydraulic damper, a spring, and a servo motor.

The locking mechanism may be at least one of an electrical lock and a mechanical lock.

The aircraft flight mode is contemplated to exclude conditions associated with taxi, takeoff, and landing, among other flight conditions for which the exit table is recommended to be returned to the retracted position.

The present invention also is contemplated to encompass a method of operation of an exit row table for an aircraft that includes a table surface deployable between a retracted position and a deployed position, an arm having a first end and a second end, the arm supporting the table surface at the first end, a support connected to the arm at the second end, the support connecting the arm to a structure interior to the aircraft, a sensor within the aircraft to detect if a seat adjacent to the table surface is occupied, and a mechanism for retracting the table surface to the retracted position if the sensor detects at least one of that the seat is not occupied and that the aircraft flight mode meets predetermined criteria. The method is contemplated to include determining if predetermined flight conditions exist, determining if the seat is occupied, and retracting the table surface to the retracted position if the sensor detects at least one of that the seat is not occupied and that the aircraft flight mode meets predetermined criteria.

In another contemplated embodiment, where the exit row table further includes a locking mechanism for locking the table surface in a predetermined position between the retracted position and the deployed position if the sensor detects that the seat is occupied and the aircraft flight mode meets predetermined criteria, the method includes generating an unlock command if the seat is not occupied and predetermined flight conditions exist, wherein an unlock command unlocks the locking mechanism. With respect to this embodiment, the method also includes retracting the table surface in response to the unlock command.

The steps of determining if the seat is occupied are contemplated to be performed periodically.

The present invention also provides for an exit row table that includes a table surface deployable between a retracted position and a deployed position, an arm having a first end and a second end, the arm supporting the table surface at the first end, a scissor connected to the arm for deploying the arm and table surface between a first position to a second position, and a support connected to the arm at the second end, the support connecting the arm to a structure interior to the aircraft.

In this embodiment, the first position is contemplated to be within a compartment, such as a side ledge or armrest, and the second position is at least partially exterior to the compartment.

In another embodiment of the invention, it is contemplated that the exit row table will include an actuator connected to the scissor for applying a force on the arm to deploy the arm between the first position and the second position. As such, the scissor is contemplated to be responsive to a momentary application of a force to deploy the table surface between the first and second positions.

Further aspects of the present invention will be made apparent form the paragraphs that follow.

BRIEF DESCRIPTION OF THE DRAWING(S)

The present invention will now be described in connection with the drawing appended hereto, in which.

DETAILED DESCRIPTION OF EMBODIMENT(S) OF THE INVENTION

The present invention will now be described in connection with one or more embodiments thereof. The discussion of the embodiments is not intended to be limiting of the present invention. To the contrary, any discussion of embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

The present invention will now be discussed in the content of the construction of a jet aircraft where one or more jet engines (also referred to as turbine engines or turbofan engines) are affixed (or attached) to each wing of the aircraft. While the invention is discussed in this context, the present invention is not intended to be limited solely to the construction of aircraft with wing-born jet engines. It is contemplated that the present invention may be employed in connection with any type of aircraft.

With respect to the discussion that follows, it is noted that specific directional conventions are assumed to be known to those skilled in the art. The directional conventions are consistent with the forward travel direction of the aircraft. In this context, the term "forward" (or its equivalent) refers to the front end (or bow end) of the aircraft. The term "rear" (or its equivalent) refers to the aft end (back end or stern) of the aircraft. The term "right side" (or its equivalent) refers to the right side (or starboard side) of the aircraft as defined by the forward and aft ends of the aircraft. The term "left side" (or its equivalent) refers to the left side (or port side) of the aircraft, also as defined by the fore and aft ends thereof.

Additionally, the term "longitudinal" refers to the longitudinal direction of the aircraft that extends from the front end to the rear end of the aircraft. The term "lateral" refers to the lateral direction of the aircraft that extends from the right side to the left side of the aircraft (i.e., as defined by the aircraft's wingspan). As should be apparent, the lateral direction is orthogonal to the longitudinal direction. The terms "up" (or top) and "down" (or bottom) refer to a vertical direction or orientation of the aircraft when the aircraft is parked on the ground.

Figure 1:
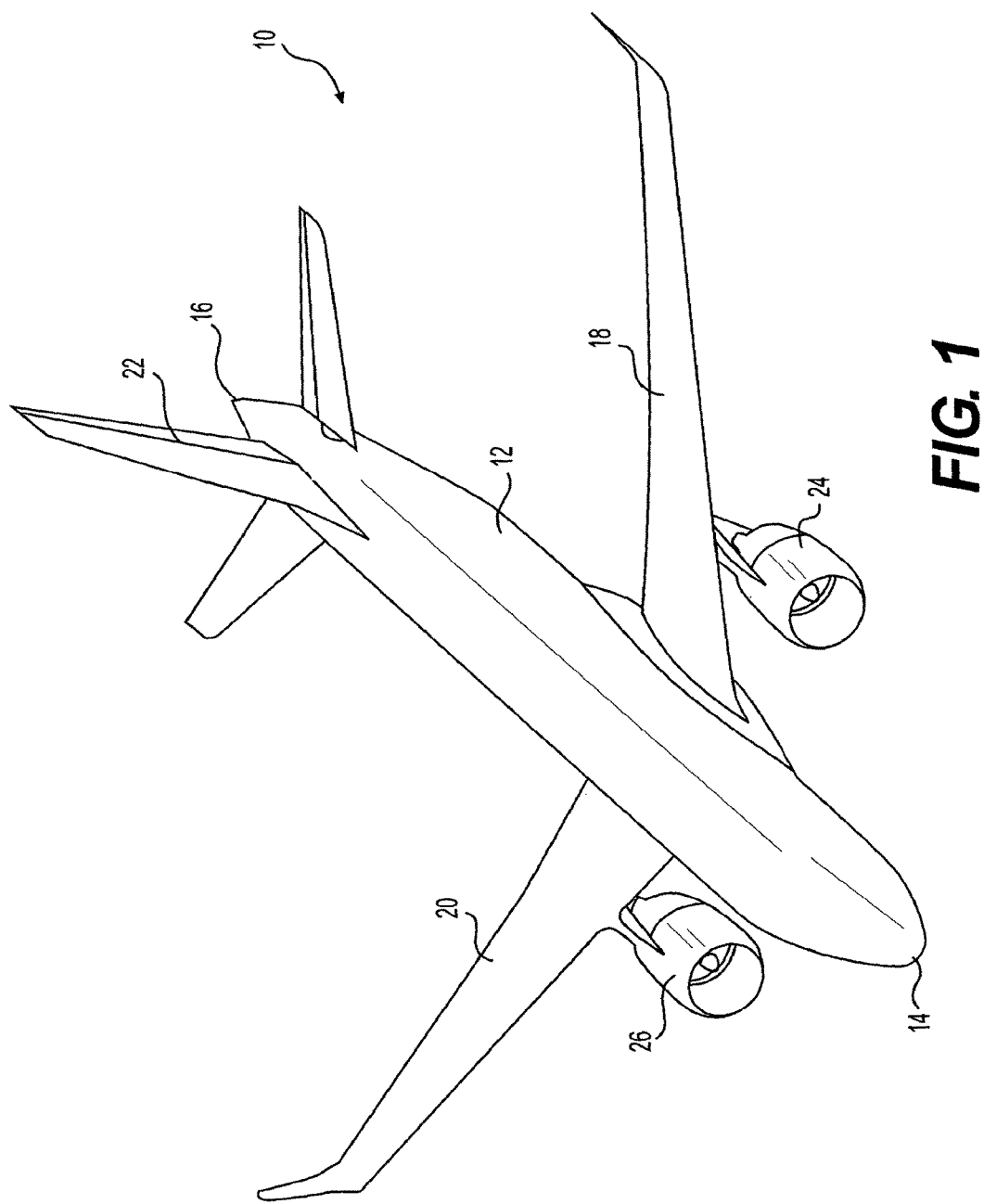
FIG. 1 is a perspective illustration of a typical aircraft on which the exit row table of the present invention may be installed.

FIG. 1 is a perspective illustration of an aircraft 10 to which the exit row table of the present invention applies. By way of introduction, the aircraft 10 includes a fuselage 12 longitudinally defining a forward end 14 and a rear (or aft) end 16. Two wings 18, 20 extend laterally from the fuselage 12. A tail section 22 (or empennage) is attached to the rear end 16 of the aircraft. As should be apparent to those skilled in the art, the wings 18, 20 and the tail section 22 incorporate multiple control surfaces that are responsible for the flying characteristics and operation of the aircraft 10. Two engines 24, 26 are suspended from and connect to the wings 18, 20, as illustrated.

Figure 2:
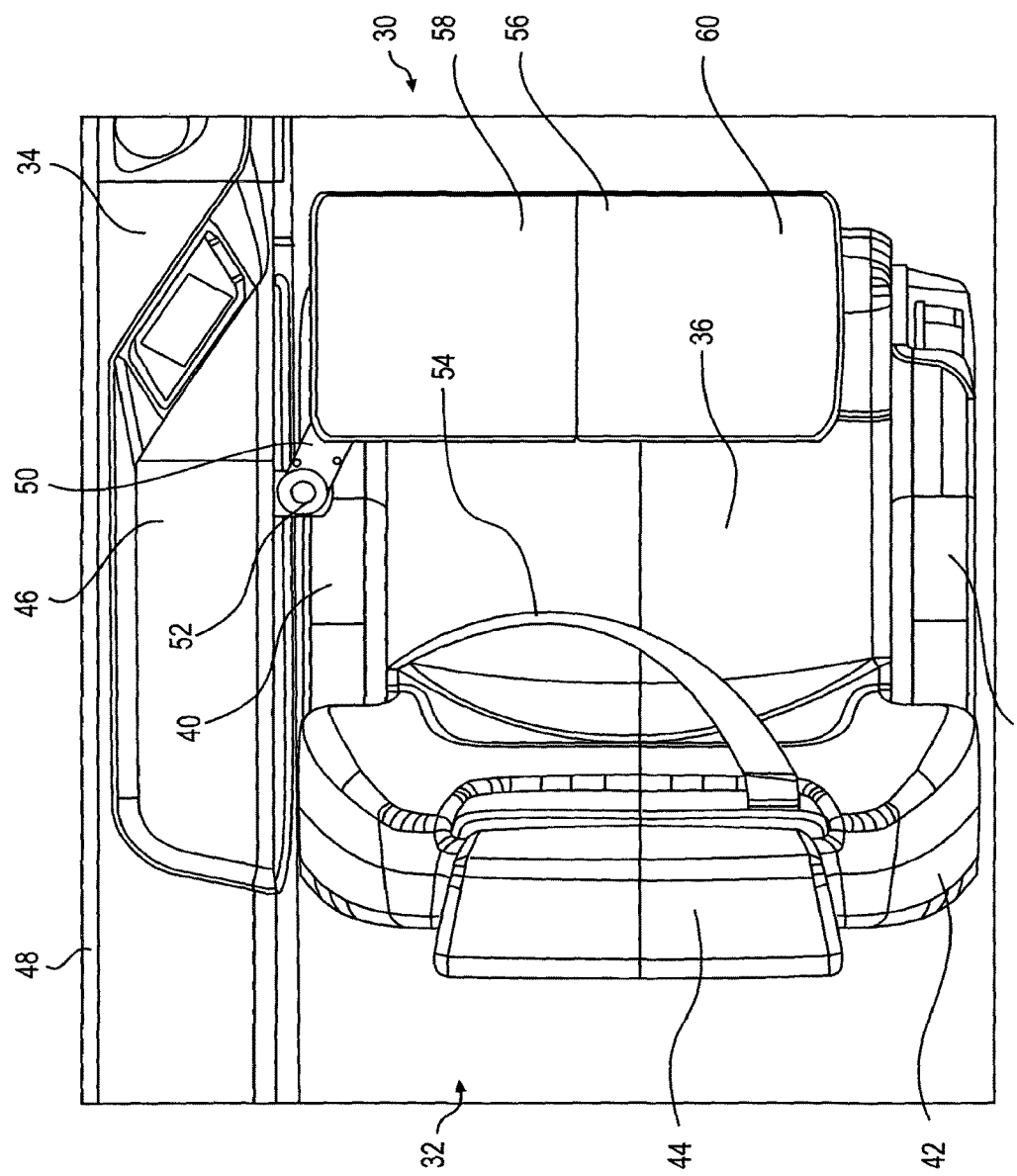
FIG. 2 is a top view of one contemplated arrangement for an emergency exit row seat, after the exit row table has been deployed.

FIG. 2 is a top view of one contemplated embodiment of an exit row table 30 according to the present invention. As should be apparent, FIG. 2 is a top view of a portion of the interior of the aircraft 10 depicted in FIG. 1. A passenger seat 32 is positioned near to the exit row table 30 such that the exit row table 30 extends partially over the passenger seat 32. The exit row table 30 is a stowable table, as discussed in the paragraphs that follow.

In this illustration, it is noted that the passenger seat 32 is forward-facing and is disposed adjacent to a sideboard 34 extending along a port (or left side) section of the fuselage 12 of the aircraft 10. The exit row table 30 is connected to the sideboard 34 and extends from a mechanism (discussed in greater detail below) that is disposed within the sideboard 34. The exit row table 30 is contemplated to be stowable in the sideboard 34.

For reference, the passenger seat 32 includes a seat cushion 36, two arm rests 38, 40, a back rest 42, and a head rest 44. It is noted that these elements of the passenger seat 32 are merely illustrative of one embodiment of a passenger seat 32 that may be used in combination with the exit row table 30 of the present invention. Any alternative passenger seat 32 may be positioned within the aircraft 10 without departing from the scope of the present invention.

In addition, it is noted that a sideboard 34 is not required for stowage of the exit row table 30 according to the present invention. It is contemplated that the exit row table 30 may be stowed in a compartment in one of the armrests 38, 40 of the passenger seat 32 without departing from the scope of the present invention. In this regard, it is noted that the exit row table 30 is contemplated to be disposed in one of the armrests 38, 40 in the instance where the seat 32 is rotatable in its position within the aircraft 10.

The sideboard 34 includes an openable cover 46. The cover 46 is contemplated to tilt upwardly and toward the fuselage wall 48 of the aircraft 10, thereby permitting the passenger to access the interior of the sideboard 34 and deploy the exit row table 30 therefrom. As illustrated in FIG. 2, after the exit row table 30 is deployed, the cover 46 is contemplated to be returned to its original position, thereby presenting a top surface for the sideboard 34 that closes off access to the interior compartment of the sideboard 34. As illustrated in FIG. 2, the exit row table 30 is supported by an arm 50 that is connected to an arm pivot 52. The arm pivot 52 permits the arm 50 to pivot with respect to the sideboard 34.

With continued reference to FIG. 2, it is noted that the passenger seat 32 includes a seat belt 54. In addition, the exit row table 30 includes a table surface 56 with a first leaf 58 and a second leaf 60. The first leaf 58 and the second leaf 60 are pivotally connected to one another so that the second leaf 60 may fold over the first leaf 58 prior to stowage of the exit row table 30 in the sideboard 34.

As should be apparent to those skilled in the art, exit rows on an aircraft 10 are subject to particular regulations that, in summary, require the exit rows of the aircraft 10 to remain unobstructed during an emergency. As a result, any tables that are deployable in association with seats in exits rows are subjected to these additional requirements. These requirements limit the manner in which tables may be deployed in connection with such seats. As noted above, tables provided for seats in exit rows typically have limited adjustability so that they comply with applicable regulations and guidelines.

As will be made apparent in the discussion that follows, FIGS. 3-9 provide a general overview of an exit row table 30 according to the present invention. FIGS. 10-15 illustrate specific embodiments of the exit row table 30 of the present invention that highlight the adjustable nature of the exit row table 30 of the present invention.

Figure 3:
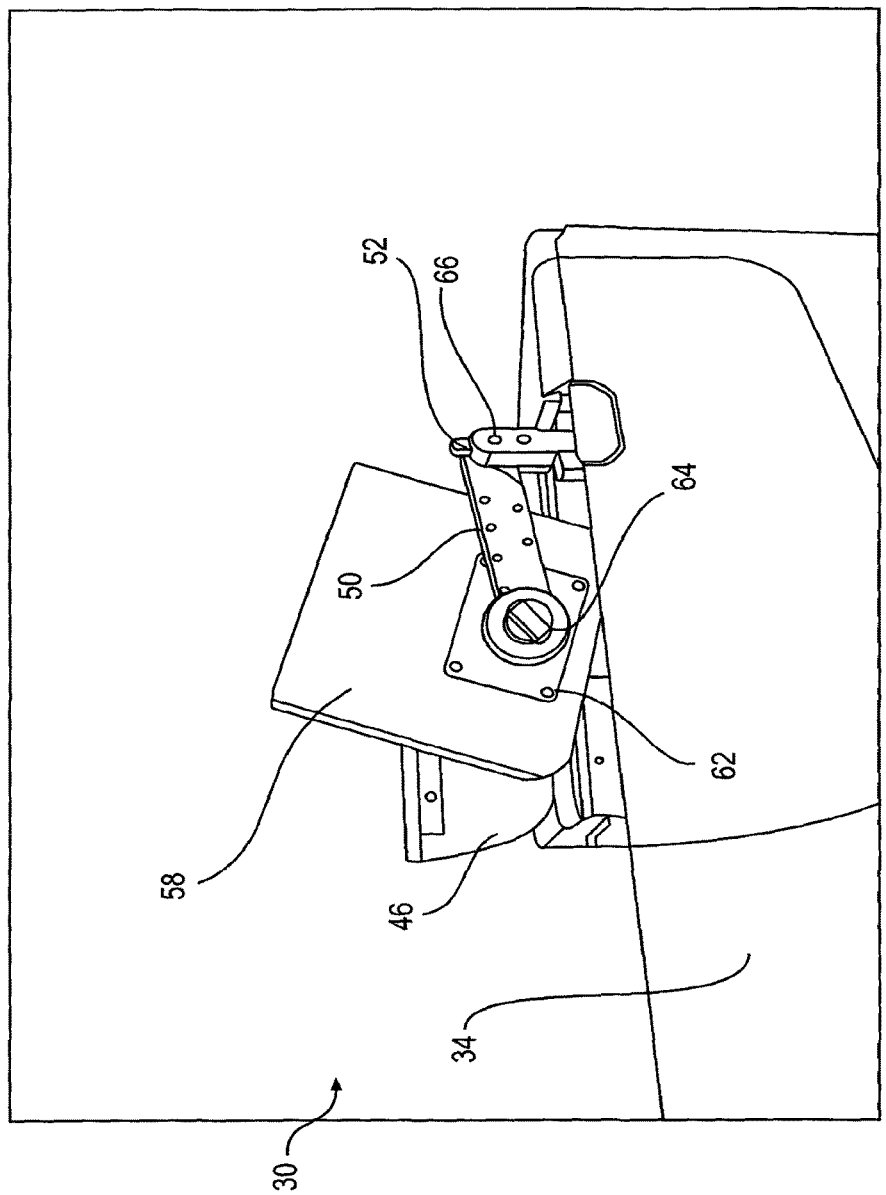
FIG. 3 is a perspective view of a prototype of the exit row table illustrated in FIG. 2, shown in a position where the exit row table is partially extracted from a sideboard adjacent to the passenger's seat.
Figure 4:
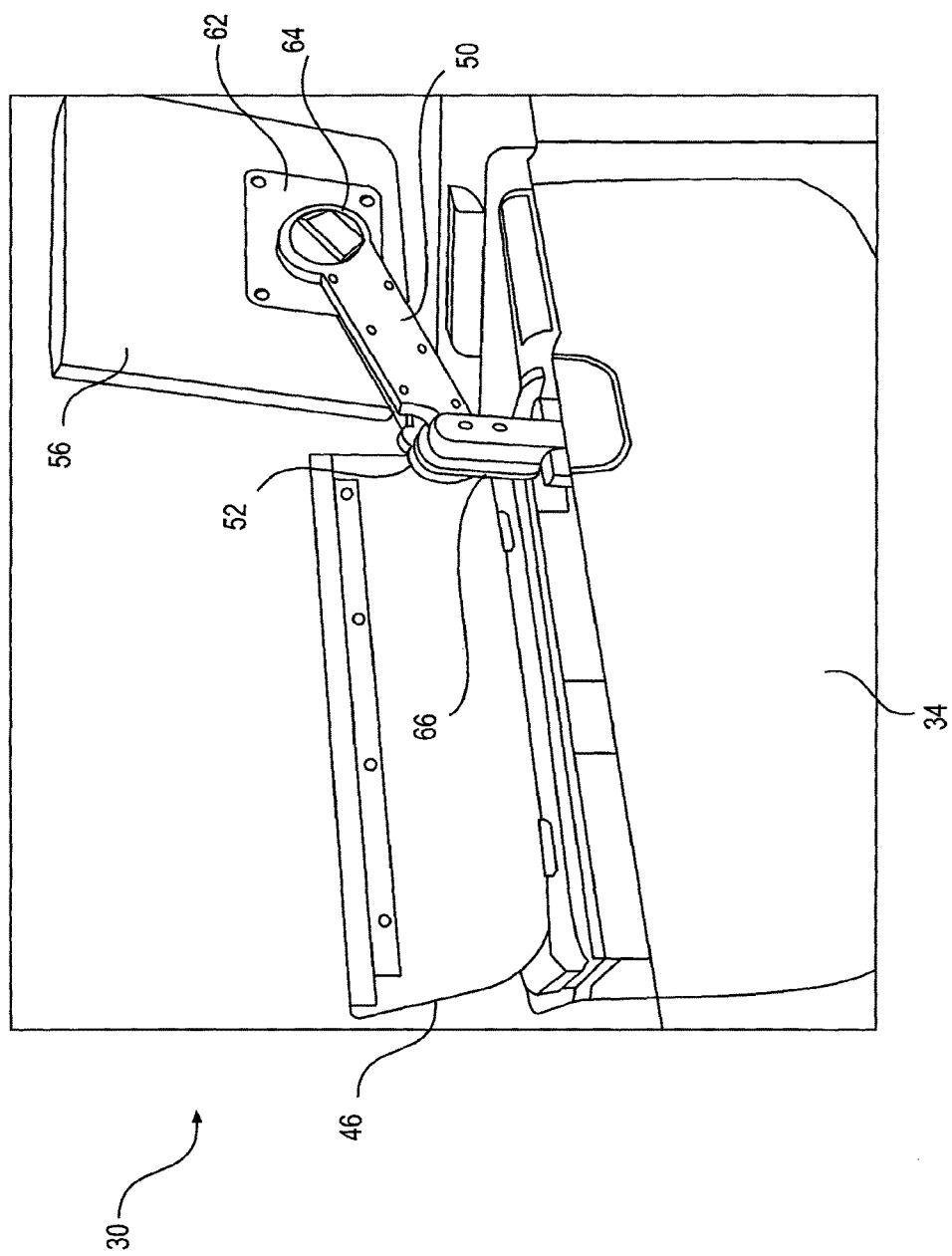
FIG. 4 is a perspective illustration of the exit row table depicted in FIG. 3, showing the exit row table at a position where the exit row table is fully extracted from the sideboard and rotated forwardly.
Figure 5:
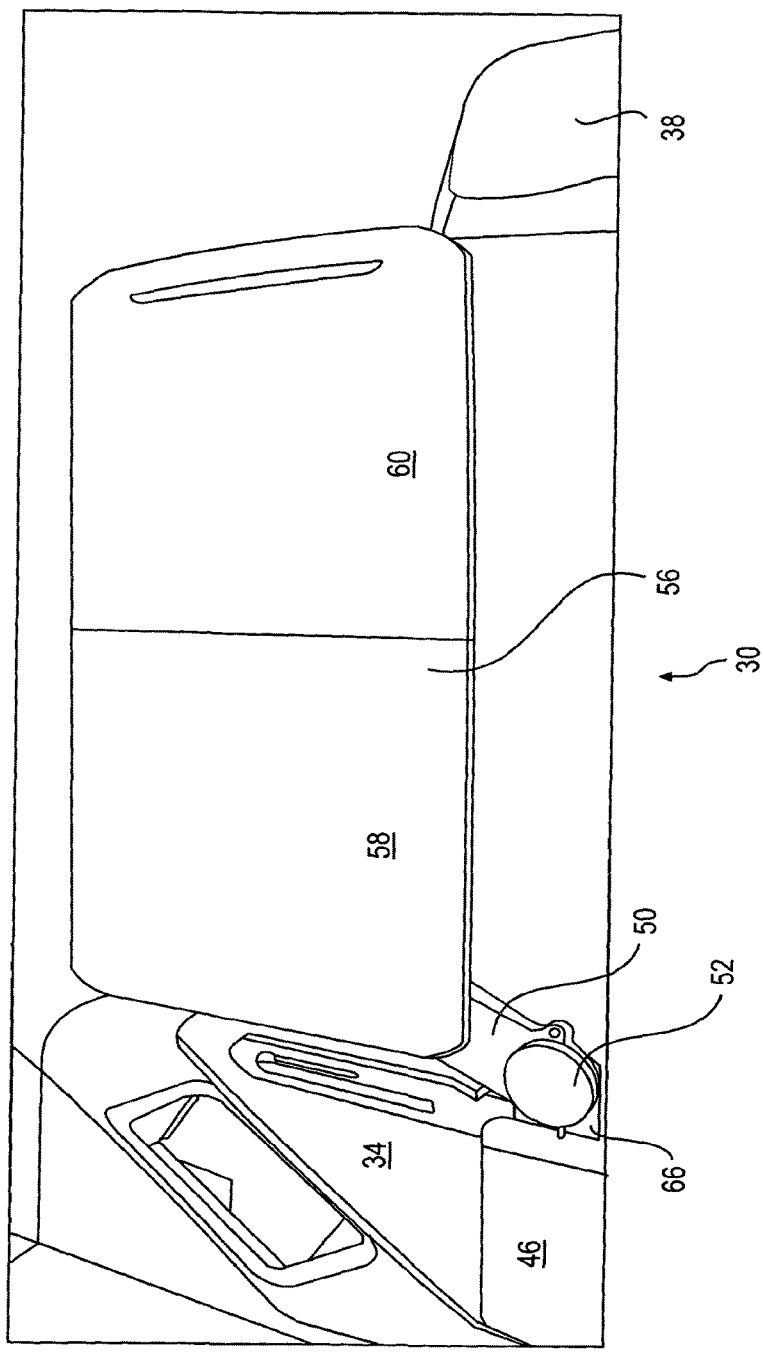
FIG. 5 is a perspective illustration of the exit row table shown in FIG. 3, where the exit row table is unfolded in front of the passenger.

FIGS. 3-5 illustrate one contemplated embodiment for the deployment of the exit row table 30 from the sideboard 34.

In FIG. 3, the exit row table 30 has been removed, almost entirely, from the sideboard 34 and is tilted toward the front end 14 of the aircraft 10, consistent with the top plan view provided in FIG. 2.

The arm 50 is visible in FIG. 3 as is the cover 46. In the view provided in FIG. 3, the cover 46 is shown in the opened position. In FIG. 3, the support plate 62 that connects the arm 50 to the first leaf 58 may be seen. A table support pivot 64 connects the support plate 62 to the arm 50 so that the support plate 62 may rotate with respect to the arm 50. It is contemplated either one or both of the arm pivot 52 and the table pivot 64 may be provided with a locking feature so that one or both of the pivots 52, 64 may be locked by the passenger in a preselected position. This locking feature will be discussed in greater detail below.

With continued reference to FIG. 3, it is noted that the arm 50 is connected to a support 66 via the arm pivot 52. When the exit row table 30 initially is deployed from the compartment in the sideboard 34, the support 66 is vertically disposed. However, the support 66 does not remain in this position. The support 66 folds downwardly toward the passenger seat 32 so that the table surface 60 is appropriately positioned above the passenger seat 32. As should be apparent, FIG. 3 illustrates the position of the exit row table 30 after the exit row table is deployed from the sideboard 34.

In connection with the deployment of the exit row table 30 from the sideboard 34, it is contemplated that the exit row table 30 will be deployable after the cover 46 of the sideboard 34 is opened. After the cover 46 is opened, the passenger has access to the exit row table 30. To release the exit row table 30 from its stowed position, the passenger applies a downward pressure on the edge of the exit row table 30 (or other component) within the sideboard 34. The momentary push releases the exit row table 30, permitting a damper (or other suitable device) to push the exit row table 30 upwardly from the compartment within the sideboard 34 to a position that is more easily manipulated by the passenger. FIG. 3 illustrates the position of the exit row table 30 after having been deployed from the sideboard 34.

FIG. 4 illustrates a second manipulation of the exit row table 30 subsequent to the release of the table from the sideboard 34. Specifically, to position the leaves 58, 60 in a location suitable for use by a person seated in the passenger seat 32, the leaves 58, 60 are rotated forward, around the arm pivot 52. As noted above, the arm pivot 52 is located at the end of the support 66 and at one end of the arm 50. The arm pivot 52 facilitates rotation of the arm 50 with respect to the support 66.

FIG. 5 is a perspective illustration of the exit row table 30 after having been deployed above the passenger seat 32. The leaves 58, 60 have been deployed from the folded, stowed condition to reveal the entirety of the table surface 56.

FIGS. 6-9 are perspective illustrations of one embodiment of the mechanism 68 contemplated to be employed with the exit row table 30 of the present invention. The mechanism 68 is disposed on a frame 70 in this illustration. When the mechanism 68 is positioned within the sideboard 34, one or more elements of the frame 70 also may be deployed in the sideboard 34. Alternatively, the cabinet that forms the sideboard 34 may connect directly to the mechanism 68 or any portion thereof.

The mechanism 68 includes a rail 72 that is connected to the bottom of the frame 70. The rail 72 is connected to the bottom of the frame 70 via a bracket 74. The rail 72 extends vertically from the bottom of the frame 70 to a position at or near the top of the frame 70. The rail 72 engages a slide 76 that slides along the rail 72. The rail 72 guides the slide 76 during its travel therealong.

The slide 76 connects to the support 66 via a support pivot 78. The support pivot 78 allows the support 66 to pivot from a vertical orientation (as shown) to a horizontal orientation, as shown in FIG. 5, for example. Being connected in this manner, the support 66 moves together with the slide 76. As a result, the support 66 moves along the vertical direction defined by the rail 72.

At its bottom end, the slide 76 connects to the top end of a scissor jack 80. The bottom end of the scissor jack 80 connects to the rail 72. Depending upon the depth of the sideledge 34, it is contemplated that the bottom end of the scissor jack 80 may connect to the bottom end of the frame 70. Still further, it is contemplated that the scissor jack 80 may connect the slide 76 to any portion of the interior of the sideledge 34 without departing from the scope of the present invention.

As illustrated, the damper 82 connects between the slide 76 and the scissor jack 80. The damper 82 biases the scissor jack 80 to an opened position where the support 66 extends above the sideboard 34, exposing the support 66, the arm 52, and the table surface 56. As noted above, the damper 82 is designed to push the table surface 56 out from the sideledge 34 after being disengaged from a stowed position. When the passenger applies a momentary downward push onto the table surface 56, the arm 50, or the support 66, the damper 82 disengages from a stowed condition to push the table surface 56 upwardly, thereby exposing the table surface 56 from the compartment within the sideledge 34. This type of release mechanism is known to those skilled in the art and is, therefore, not discussed in greater detail herein.

Figure 6:
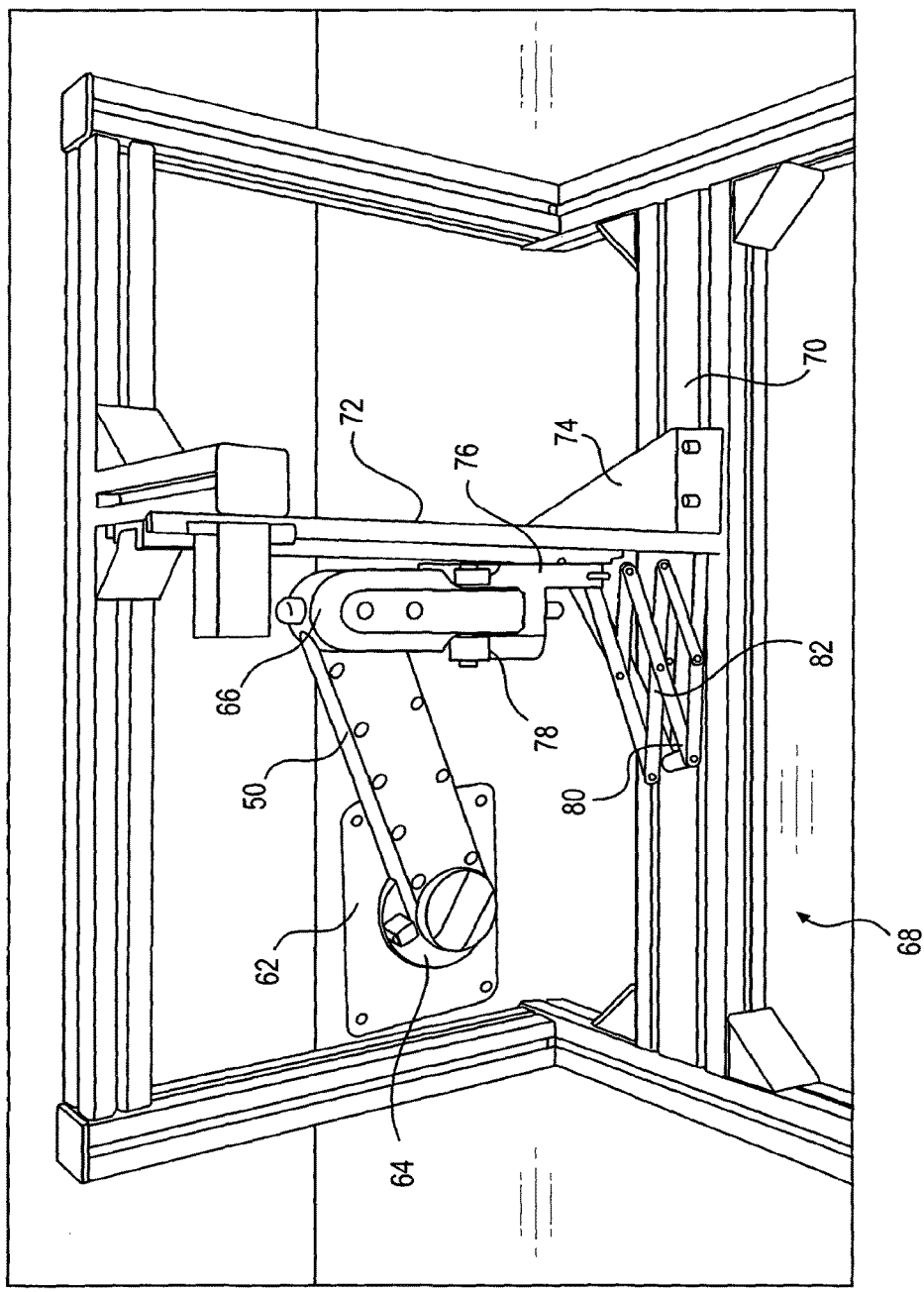
FIG. 6 is a perspective illustration of one contemplated embodiment of a mechanism that may be employed with the exit row table illustrated in FIG. 3, the mechanism being positionable within the sideboard and being shown in a fully retracted condition.
Figure 7:
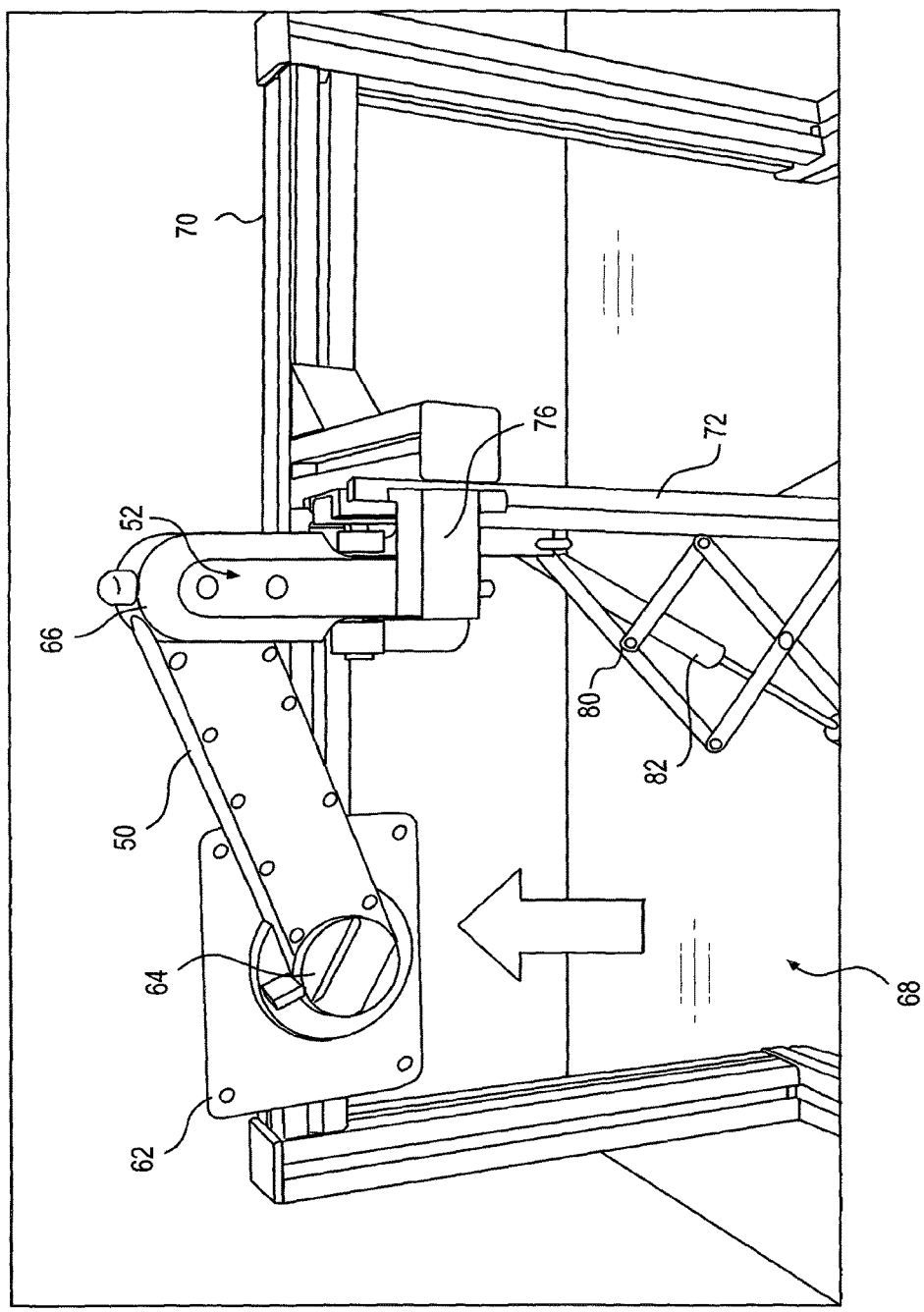
FIG. 7 is a perspective illustration of the mechanism illustrated in FIG. 6, where the mechanism has deployed the exit row table from within the sideboard.

FIG. 7 is a perspective illustration of the mechanism 68 illustrated in FIG. 6, after the support 66 has extended exteriorly to the sideboard 34. As is apparent from this illustration, the scissor jack 80 is in an extended condition. As a result, the support 66 and arm 50 are at least partially exposed from the sideledge 34, consistent with the view provided in FIG. 3.

As noted above, the support 66 is contemplated to slide vertically along the rail 72, together with the slide 76 to which the support 66 is pivotally attached. The slide 76 connects to the scissor jack 80 and the damper 82 such that, under the power of the damper 82, the slide 76 is pushed upwardly along the rail 72. As noted, after the passenger applies a momentary downward force on the mechanism 68, the mechanism 68 is released from a stowed condition within the sideledge 34.

Figure 8:
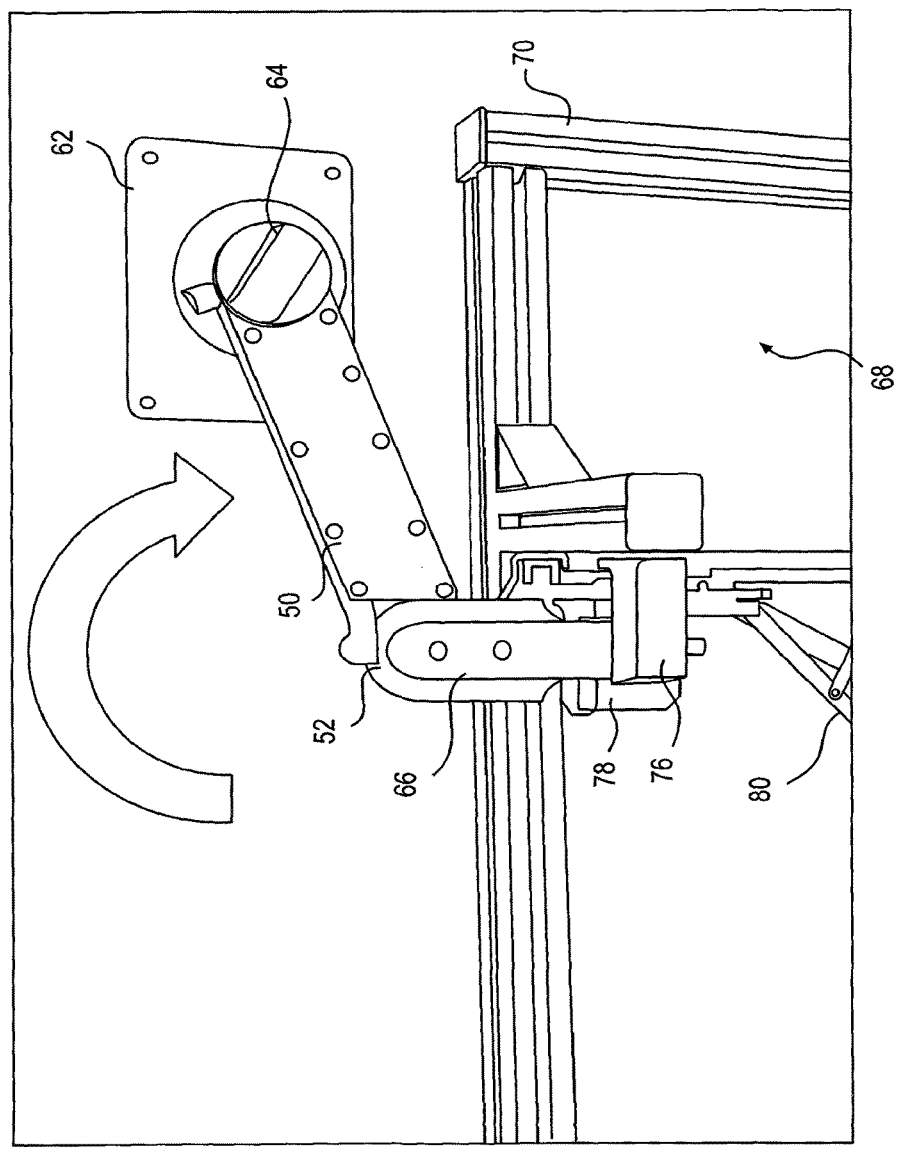
FIG. 8 is a perspective illustration of the mechanism illustrated in FIG. 6, after the table support structure of the mechanism has been shifted forward so that the exit row table may be unfolded in front of the passenger.

Once the support 66 is exposed exterior to the sideledge 34, the arm 50 is rotated about the arm pivot 52 as illustrated in FIG. 8. The support plate 62 is then positioned sufficiently forward of the passenger seat 32 that the arm 50 may be folded down to position the table surface 56 in front of the passenger, above the passenger's legs.

Figure 9:
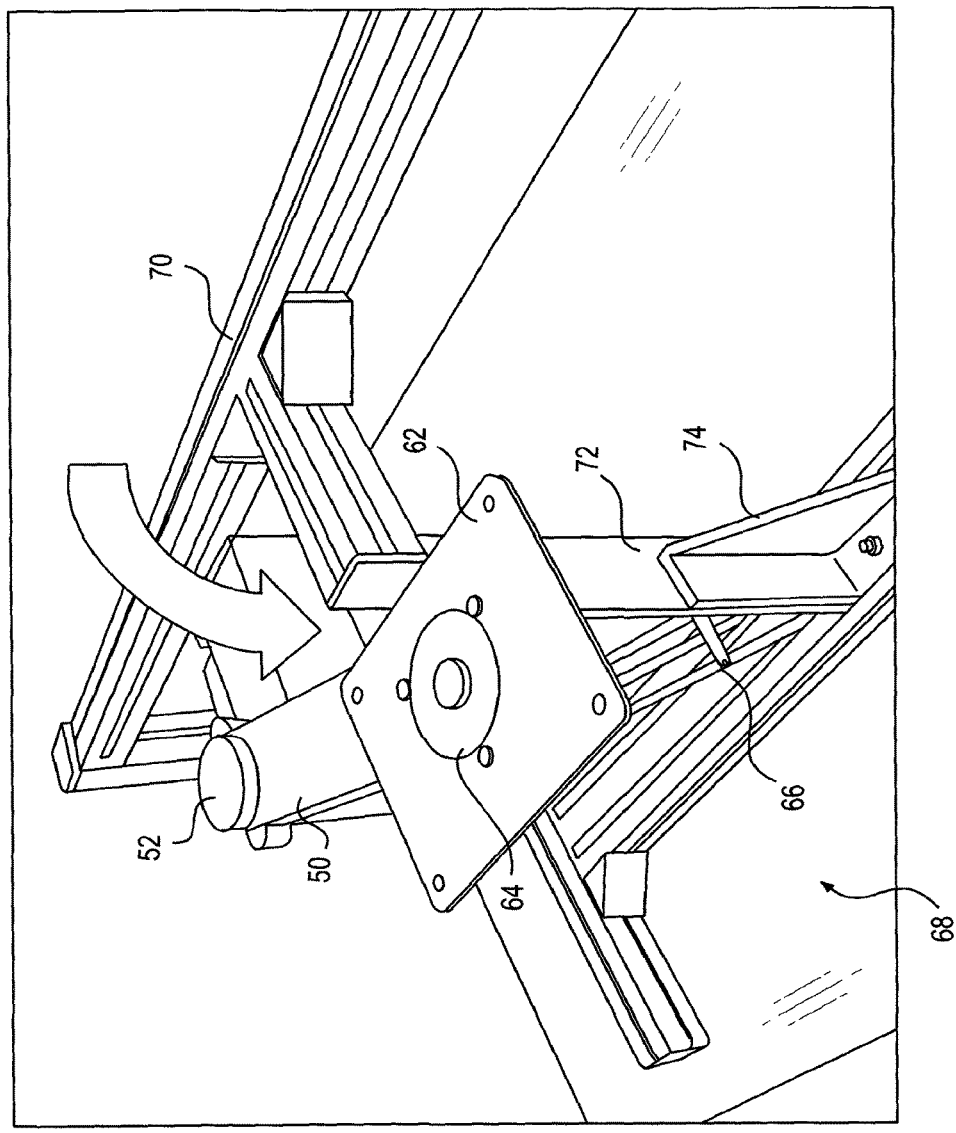
FIG. 9 is perspective illustration of the mechanism illustrated in FIG. 6, where the table support structure has been deployed in an opened position.

FIG. 9 illustrates the motion of the support plate 62 around the support pivot 78 (see FIG. 8), permitting the support plate 62 to be moved from a vertical orientation to a horizontal orientation. In this horizontal orientation, the leaves 58, 60 may be opened to expose the full surface area of the table surface 56.

In FIGS. 1-9, the present invention is described in connection with an exit row table 30 according to the present invention. The exit row table 30 is constructed so that the table surface 56 may be pushed away from the passenger seated in the seat 32. More specifically, the exit row table 30 is adjustable in the longitudinal direction of the aircraft 10 such that the table surface 56 may be pushed into the emergency exit row passage, at least to some small degree. As noted above, during an emergency (or other predetermined flight conditions), it is not permitted for any portion of the exit row table 30 to extend into any portion of a passageway reserved for emergency egress from the aircraft 10. It should be apparent that, although depicted as being located in a vicinity of an emergency exit, the table 30 might be located anywhere else in the cabin without departing from the scope of the present invention.

In connection with the feature permitting the table surface 56 to be pushed away from the passenger, three embodiments are presented in connection with FIGS. 10-15. These three embodiments are not intended to be limiting of the present patent application. Instead, the three embodiments are intended to illustrate the breadth and scope of the present invention. Where applicable, like reference numbers are used to refer to like features.

Figure 10:
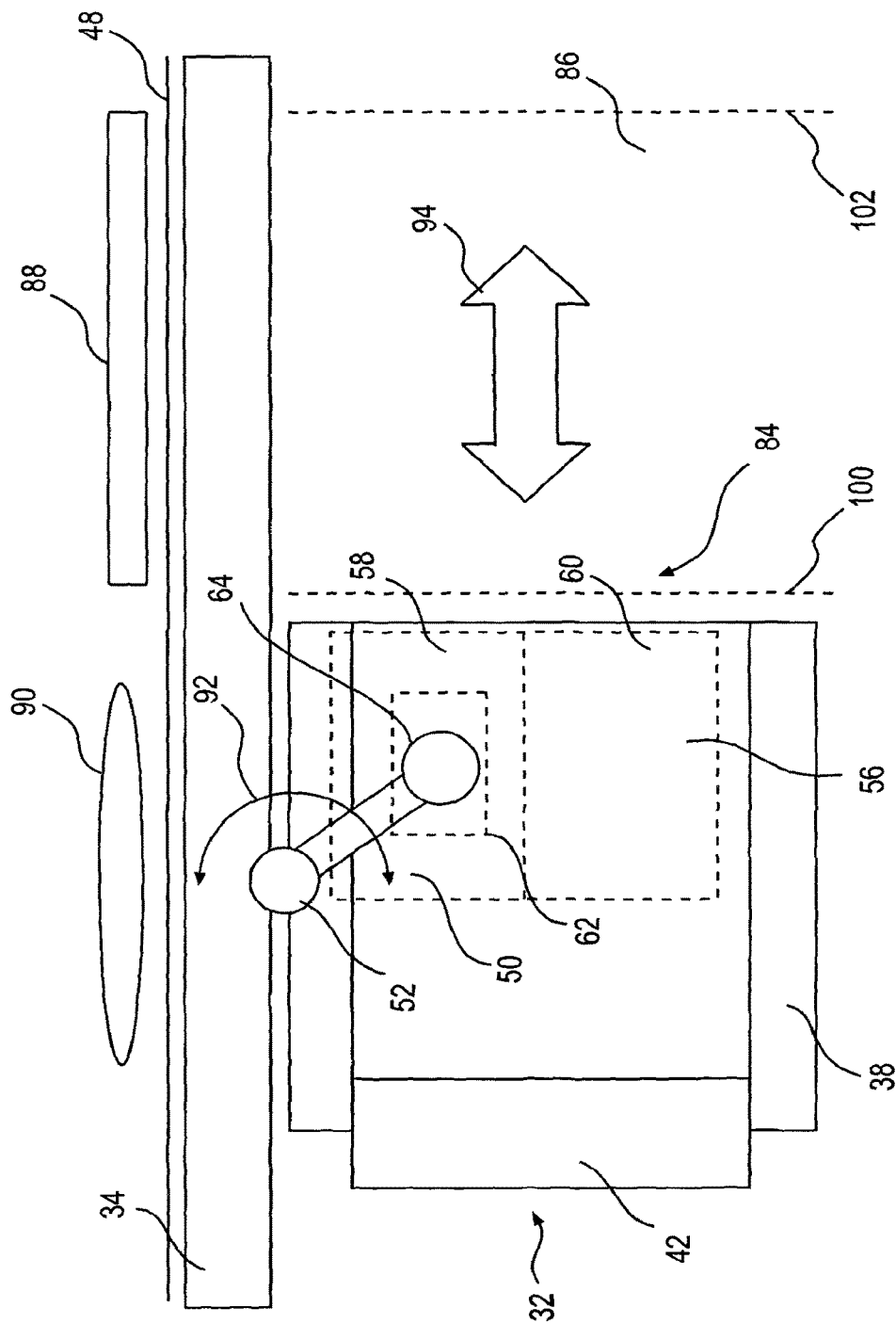
FIG. 10 is a graphical, top view of a first contemplated embodiment of the exit row table of the present invention, showing the exit row table in a retracted position above the passenger seat.

FIG. 10 is a graphical, top view of an embodiment of an exit row table 84 of the present invention after having been deployed from the sideledge 34 and after having been extended to an unfolded state above the passenger seat 32.

The exit passageway 86 is illustrated in front of the passenger seat 32. A door 88 (such as an emergency exit door or an emergency exit portal) is positioned at the end of the exit passageway 86. The door 88 extends through the fuselage wall 48. A window 90 is positioned rearward of the door 88, next to the passenger seat 32.

As indicated in FIG. 10, the arm 50 is permitted to rotate about the arm pivot 52 in the direction of the arrow 92. So that the table surface 56 may remain in the correct orientation with respect to the passenger seat 32, the table surface 56 is permitted to rotate about the table support pivot 64. As also indicated in FIG. 10, the exit row table 84 is permitted to shift forwardly and rearwardly, in the direction of the arrows 94.

Figure 11:
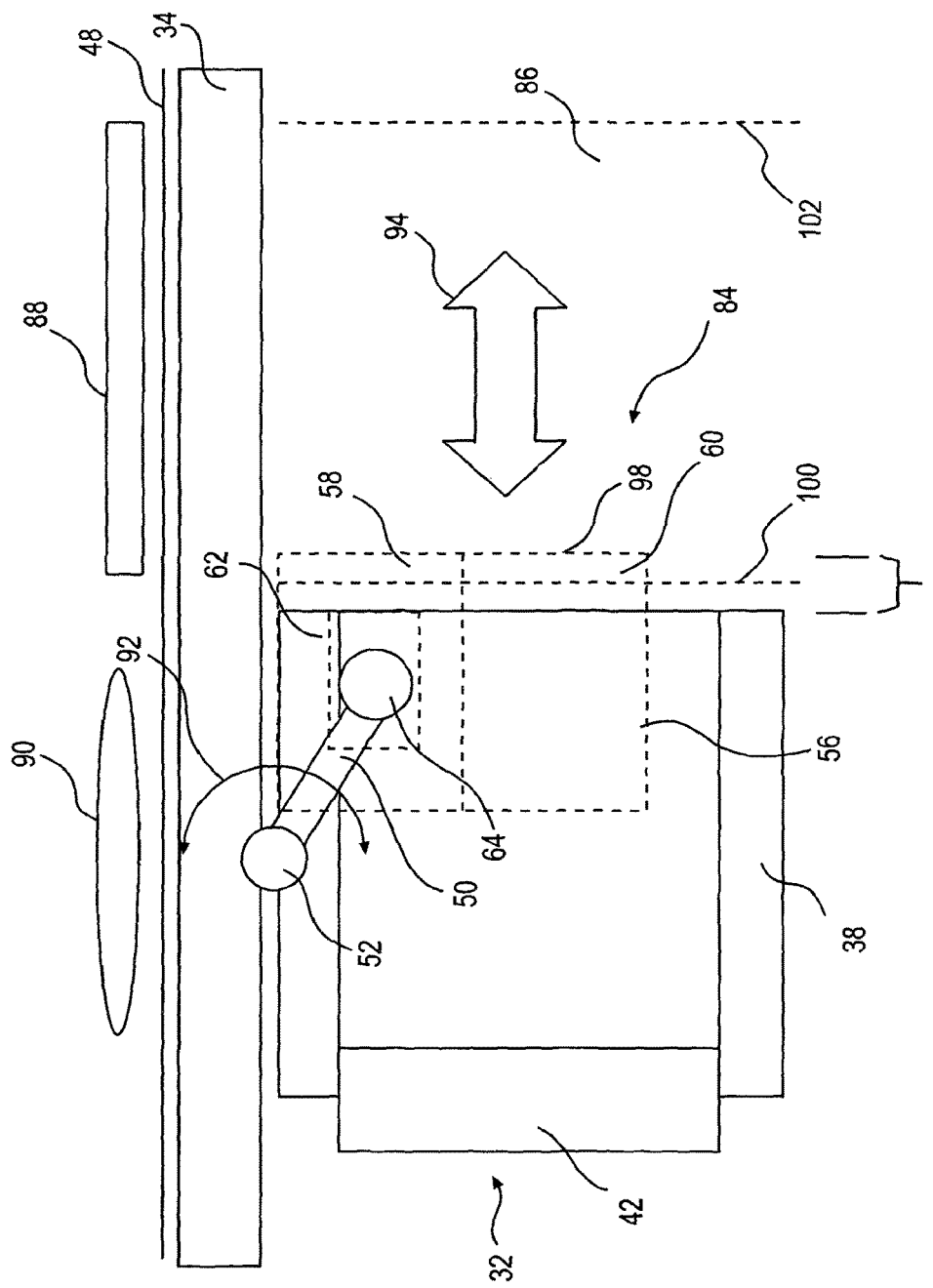
FIG. 11 is a graphical, top view of the first embodiment of the exit row table of the present invention, showing the exit row table in a deployed position, which is displaced forward of the retracted position.

FIG. 11 is a graphical, top view of the exit row table 84 depicted in FIG. 10. In this view, the table surface 56 (along with other components) is shifted forwardly from its initial position by a distance 96. As is apparent from FIG. 11, the distance 96 places the front edge 98 of the table surface 56 into the area marked as the exit passageway 86. As is apparent in FIG. 11, the table surface 56 has been shifted forwardly and toward the sideledge 34 by comparison with the position illustrated in FIG. 10

So that the leading edge 98 of the table surface 56 does not remain within the boundaries 100, 102 during an emergency (or any other combination of predetermined flight conditions), the exit row table 84 is provided with a mechanism that facilitates automatic retraction of the exit row table 84 under certain conditions. The mechanism is discussed in greater detail in connection with FIG. 16. The retracted condition of the exit row table 84 is illustrated in FIG. 10. The deployed condition of the exit row table 84 is shown in FIG. 11.

Figure 12:
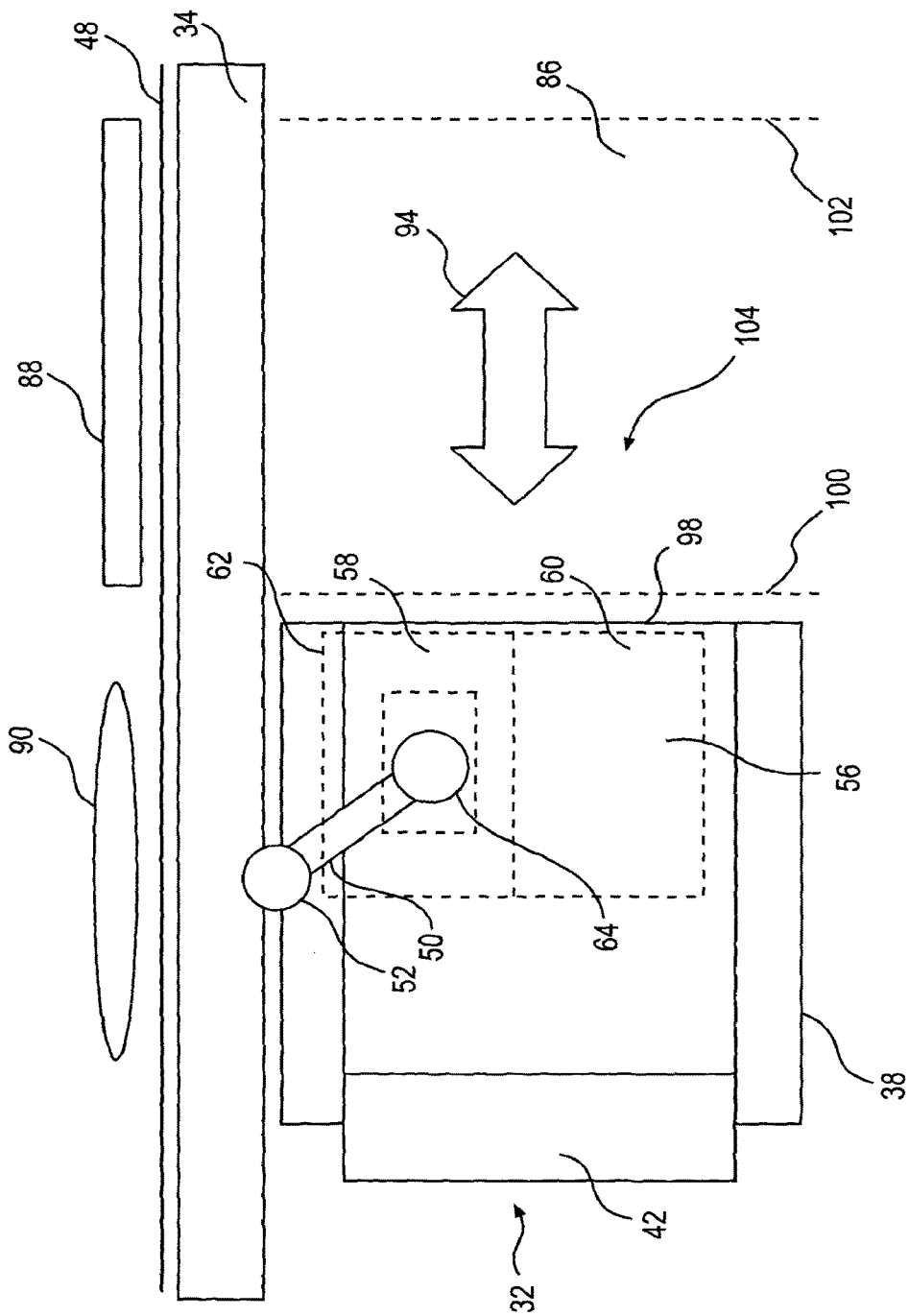
FIG. 12 is a graphical, top view of a second embodiment of the exit row table of the present invention, showing the exit row table in the retracted position above the passenger seat, consistent with the position illustrated in FIG. 10.

FIG. 12 is a graphical, top view of another embodiment of an exit row table 104 according to the present invention. In this view, the table surface 56 has been unfolded and is in the retracted position such that the leading edge 98 of the table surface 56 is not disposed within the exit passageway 86 as defined by the boundaries 100, 102.

Figure 13:
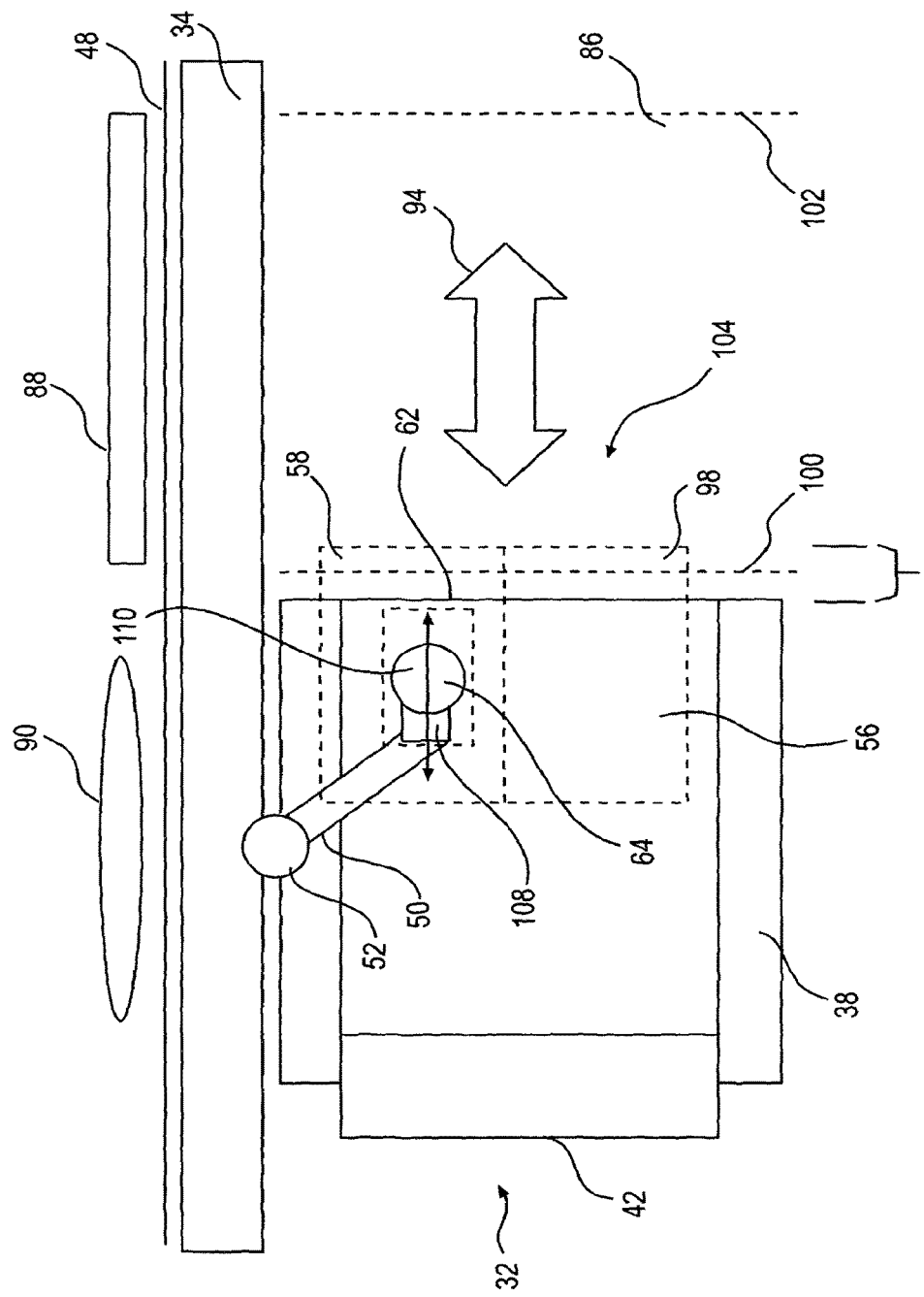
FIG. 13 is a graphical, top view of the second embodiment of the exit row table of the present invention, showing the exit row table in the deployed position, consistent with the position illustrated in FIG. 11.

FIG. 13 is a graphical top view of the embodiment of the exit row table 104 illustrated in FIG. 12. In this view, the table surface 56 has been displaced forwardly along the arrows 94 with respect to the passenger seat 32. The forward displacement is indicated by the distance 106.

To facilitate this forward translation, the arm 50 is connected to an extension 108 that extends along the longitudinal direction of the aircraft 10. The extension 108 permits the table surface 56 to slide therealong, in the direction of the arrows 110. Alternatively, the extension 108 may slide with respect to the arm 50.

As in the previous embodiment, so that the leading edge 98 of the table surface 56 does not remain within the boundaries 100, 102 of the exit passageway 86 during an emergency, the exit row table 104 is provided with a mechanism that facilitates retraction, as discussed in greater detail in connection with FIG. 17. As in the previous embodiment, FIG. 12 illustrates the exit row table 104 in a retracted condition. FIG. 13 illustrates the exit row table 104 in a deployed (or extended) condition.

Figure 14:
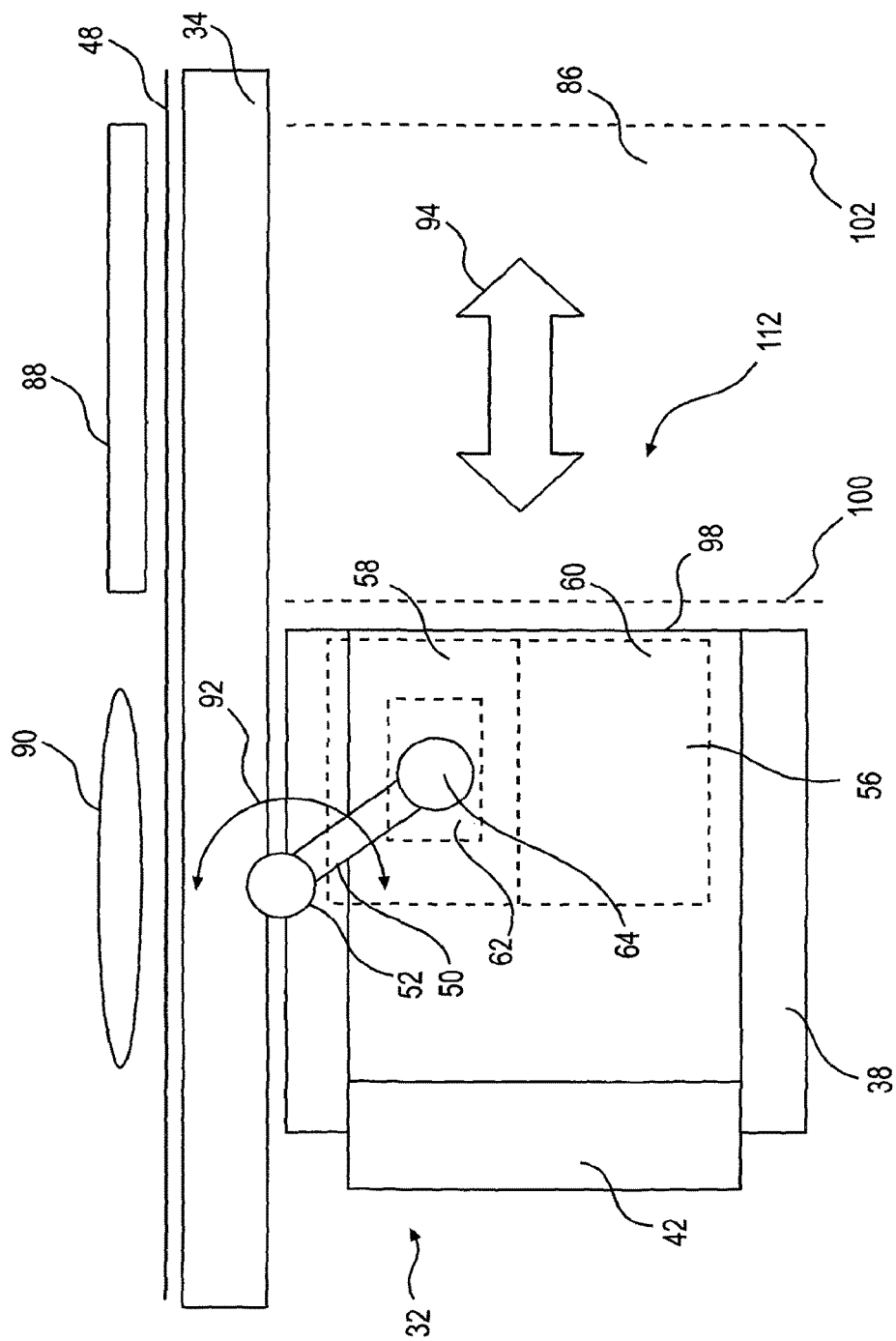
FIG. 14 is a graphical, top view of a third embodiment of the exit row table of the present invention, showing the exit row table in the retracted position above the passenger seat, consistent with the position illustrated in FIG. 10.

FIG. 14 is a graphical, top view of still another embodiment of an exit row table 112 according to the present invention. FIG. 14 illustrates the exit row table 112 in a retracted condition.

Figure 15:
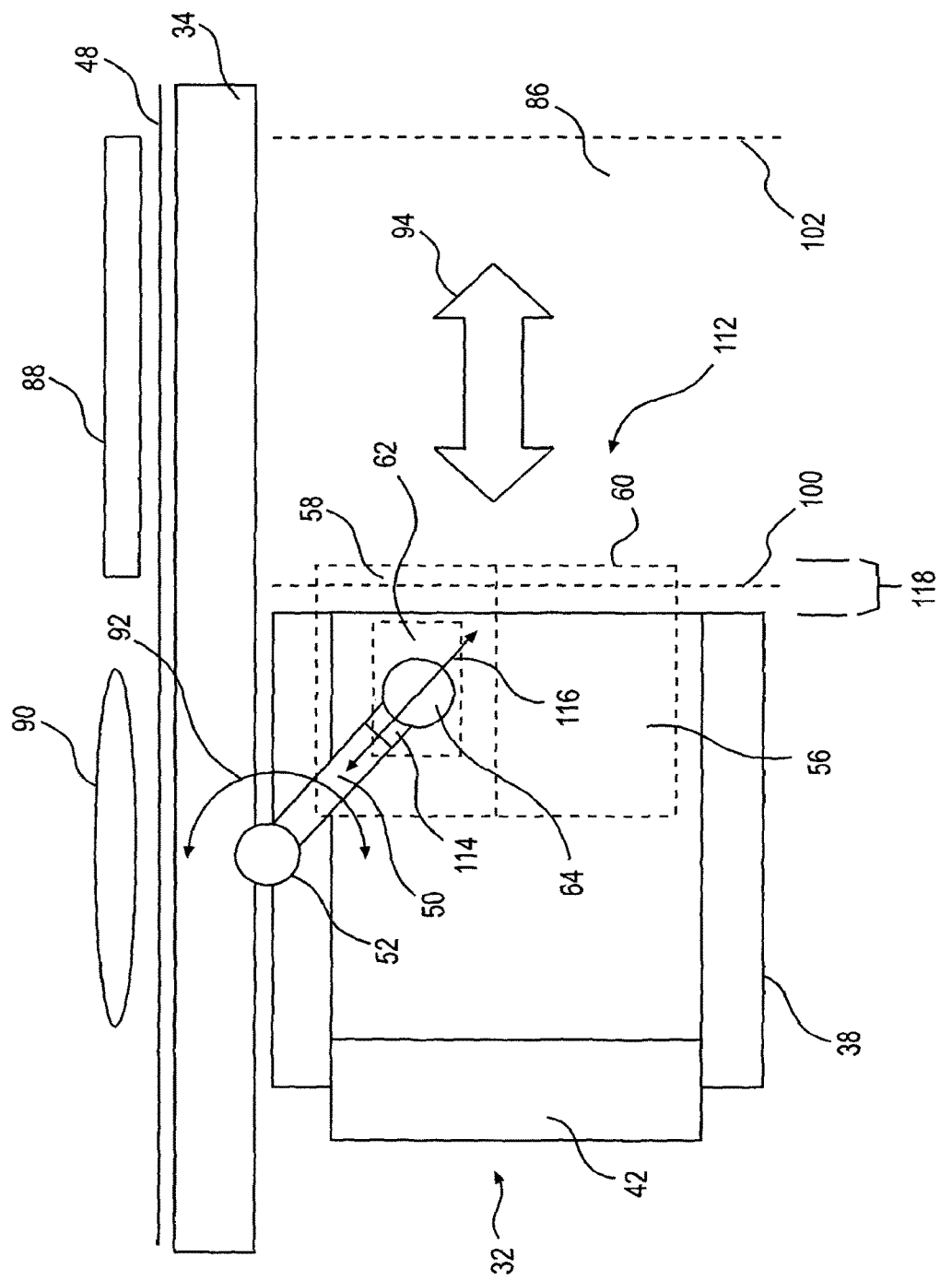
FIG. 15 is a graphical, top view of the third embodiment of the exit row table of the present invention, showing the exit row in the deployed position, consistent with the position illustrated in FIG. 11.

FIG. 15 illustrates the exit row table 112 in a deployed or extended condition. So that the table surface 56 may extend at least partially into the exit passageway 86, an extension 114 is provided. The extension 114 permits the table support pivot 64 to shift along the direction of the arrows 116. As indicated, the table surface may extend a distance 118 from the initial condition.

As with the previous two embodiments, so that the leading edge 98 of the table surface 56 does not remain within the boundaries 100, 102 of the exit passageway 86 during an emergency, the exit row table 112 is provided with an automatic retraction mechanism, which is described in greater detail in connection with FIG. 18.

Figure 16:
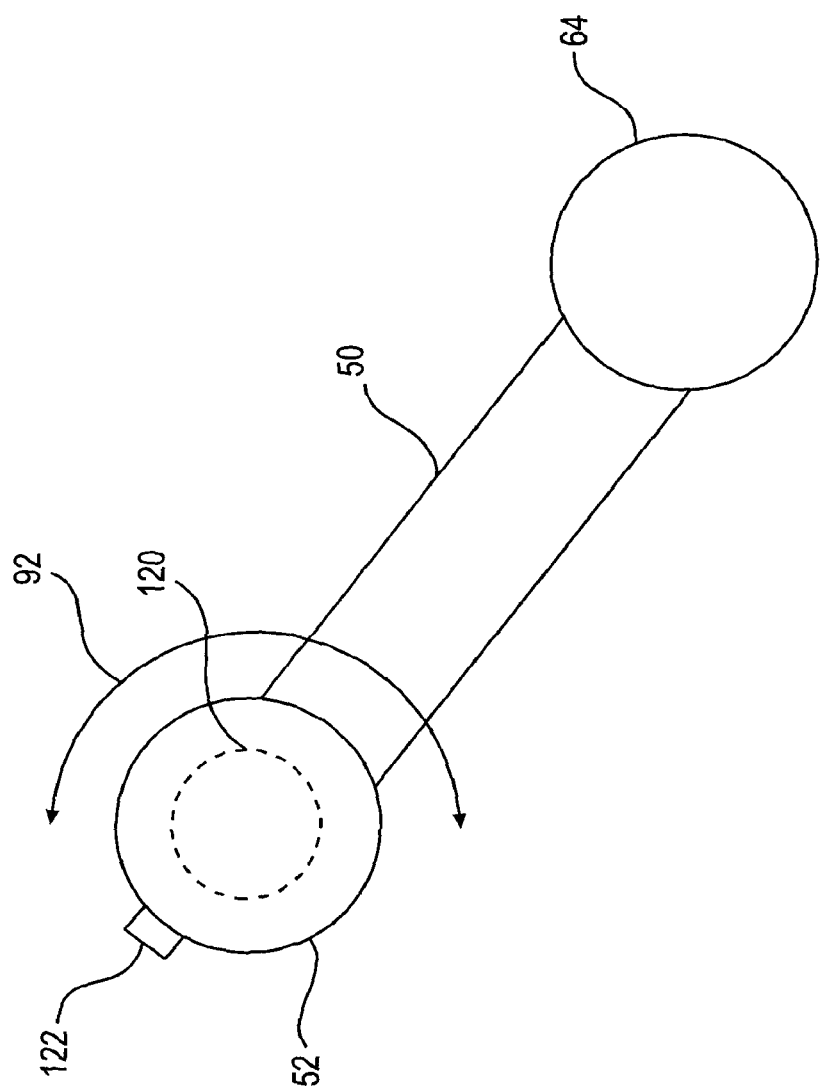
FIG. 16 is a graphical, top view of a portion of the exit row table illustrated in FIGS. 10-11.

FIG. 16 is graphical, top view of a portion of the exit row table 84 that is shown in FIGS. 10-11. Specifically, FIG. 16 illustrates the arm 50, arm pivot 52, and table support pivot 64. As noted above, the arm is pivotable around the axis defined by the arm pivot 52 as indicated by the arrows 92.

So that the arm 50 may be retracted during an emergency or under other preselected conditions, the pivot 52 includes a retraction mechanism 120. The retraction mechanism 120 biases the arm 50 so that the arm 50 moves, as a default, into the retracted position illustrated in FIG. 10. So that the arm 50 will remain in a deployed position selected by the passenger in the seat 32, a locking mechanism 122 is provided adjacent to the retraction mechanism 120.

It is noted that the passenger in the passenger seat 32 may select a deployment position for the table surface 56 at any point between the fully retracted position and the fully deployed position. If the locking mechanism 122 is not activated, the table surface 56 will automatically default to the retracted position.

As noted above, one aspect of the present invention is to assure that the exit passageway 86 in front of the passenger seat 32 remains unobstructed, especially in the event of an emergency that would require access to the door 88. It is for this reason, among others, that the retraction mechanism 120 defaults to a retracted position unless the locking mechanism 122 is engaged. As discussed in greater detail with respect to FIGS. 19-20, the locking mechanism 122 is available to be actuated only when the seat 32 is occupied. If the seat 32 is not occupied, a person is not able to deploy the table surface 56.

The retraction mechanism 120 may include any of a number of different devices for its operation. It is contemplated, for example, that the retraction mechanism 120 may be a pneumatic damper. Alternatively, the retraction mechanism 120 may be a hydraulic damper. Still further, it is contemplated that the retraction mechanism 120 may be a spring. The retraction mechanism 120 also may be a servo motor or a solenoid, as desired. As should be apparent from the foregoing, the exact construction and operation of the retraction mechanism 120 is not critical to the operation of the present invention.

Similarly, the locking mechanism 122 may be constructed in any of a number of different ways without departing from the scope of the present invention. The locking mechanism 122 may be an electrical switch, a mechanical switch, or an electro-mechanical switch, as should be apparent to those skilled in the art.

In addition, the exact position of the locking mechanism 122, while shown adjacent to the arm pivot 52, is not critical to the operation of the present invention. The locking mechanism 122 may be placed at any suitable location without departing from the scope of the present invention. While it is contemplated that the locking mechanism 122 will be located somewhere on the structure of the exit row table 84, the locking mechanism 122 may be positioned remotely (e.g., on the arm rest 38) without departing from the scope of the present invention.

Figure 17:
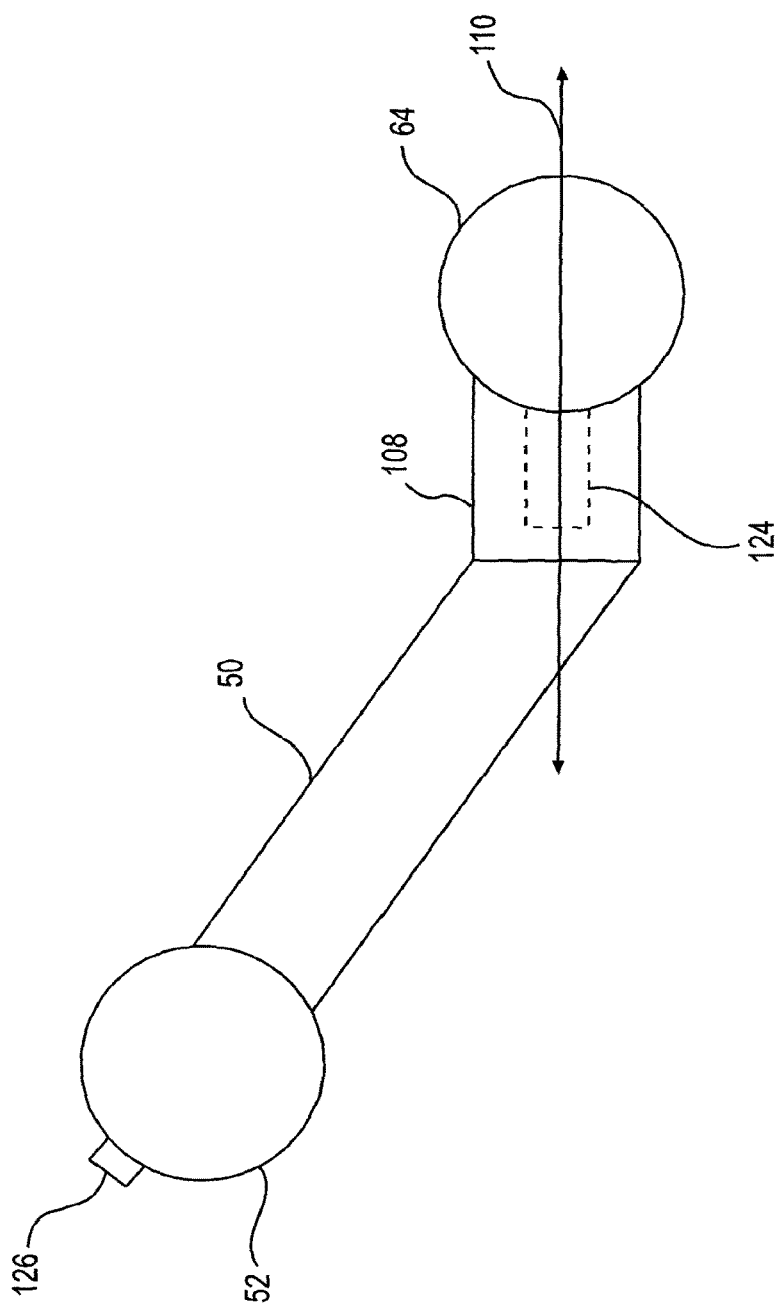
FIG. 17 is a graphical, top view of a portion of the exit row table illustrated in FIGS. 12-13.

FIG. 17 is a graphical, top view of a portion of the exit row table 104 illustrated in FIGS. 12-13. Specifically, FIG. 17 illustrates the arm 50, arm pivot 52, and table support pivot 64. In this embodiment, an extension 108 extends from the end of the arm 50.

As should be apparent for this embodiment of the exit row table 104, the arm 50 is not contemplated to pivot around the arm pivot 52. Instead, movement of the table surface 56 is made possible by the extension 108.

So that the table surface 56 may be retracted during an emergency or under other preselected conditions, the extension 108 includes a retraction mechanism 124. The retraction mechanism 124 in the illustrated embodiment is contemplated to be connected to the table support pivot 64, which slides along the extension 108. As in the prior embodiment, the retraction mechanism 124 is biased so that the table support pivot 64 (and, therefore, the table surface 56) is in the retracted position. As before, the retracted position is the default position that is illustrated in FIG. 12. So that the table surface 56 will remain in a deployed position selected be the passenger in the seat 32, a locking mechanism 126 is provided adjacent to the arm pivot 52.

It is noted that the passenger in the passenger seat 32 may select a deployment position for the table surface 56 at any point between the fully retracted position and the fully deployed position. If the locking mechanism 126 is not activated, the table surface 56 will automatically default to the retracted position.

As noted above, one aspect of the present invention is to assure that the exit passageway 86 in front of the passenger seat 32 remains unobstructed, especially in the event of an emergency that would require access to the door 88. It is for this reason, among others, that the retraction mechanism 124 defaults to a retracted position unless the locking mechanism 126 is engaged. As discussed in greater detail with respect to FIGS. 19-20, the locking mechanism 126 is available to be actuated only when the seat 32 is occupied. If the seat 32 is not occupied, a person is not able to deploy the table surface 56.

The retraction mechanism 124 may include any of a number of different devices for its operation. It is contemplated, for example, that the retraction mechanism 124 may be a pneumatic damper. Alternatively, the retraction mechanism 124 may be a hydraulic damper. Still further, it is contemplated that the retraction mechanism 124 may be a spring. The retraction mechanism 124 also may be a servo motor or a solenoid, as desired. As should be apparent from the foregoing, the exact construction and operation of the retraction mechanism 124 is not critical to the operation of the present invention.

Similarly, the locking mechanism 126 may be constructed in any of a number of different ways without departing from the scope of the present invention. The locking mechanism 126 may be an electrical switch, a mechanical switch, or an electro-mechanical switch, as should be apparent to those skilled in the art. In another contemplated embodiment, it is contemplated that the locking mechanism 126 might be combined with the retraction mechanism 124. In other words, the present invention is not intended to be limited solely to embodiments where the retraction mechanism 124 and the locking mechanism 126 are elements that are separate from one another.

In addition, the exact position of the locking mechanism 126, while shown adjacent to the arm pivot 52, is not critical to the operation of the present invention. The locking mechanism 126 may be placed at any suitable location without departing from the scope of the present invention.

While it is contemplated that the locking mechanism 126 will be located somewhere on the structure of the exit row table 104, the locking mechanism 126 may be positioned remotely (e.g., on the arm rest 38) without departing from the scope of the present invention.

Figure 18:
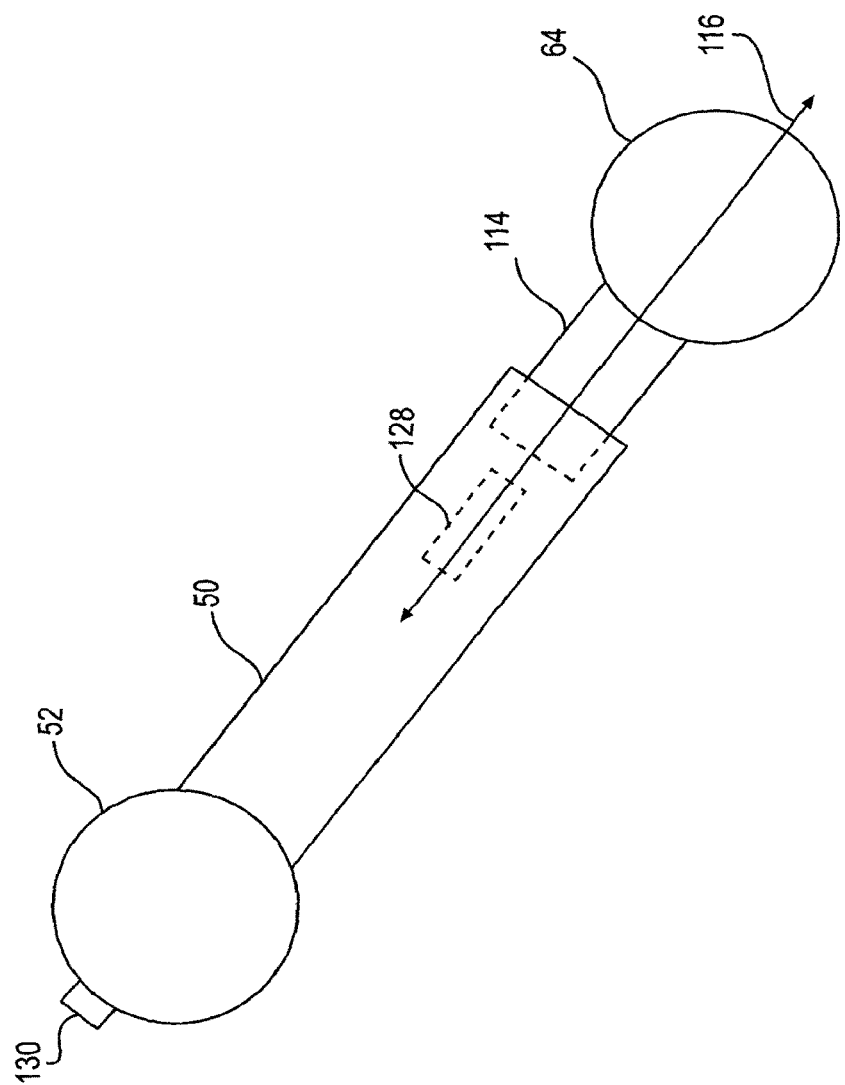
FIG. 18 is a graphical, top view of a portion of the exit row table illustrated in FIGS. 14-15.

FIG. 18 is a graphical, top view showing a portion of the exit row table depicted in FIGS. 14-15. As should be apparent for this embodiment of the exit row table 112, the arm 50 is not contemplated to pivot around the arm pivot 52. Instead, movement of the table surface 56 is made possible by the extension 114.

So that the table surface 56 may be retracted during an emergency or under other preselected conditions, the extension 114 includes a retraction mechanism 128. The retraction mechanism 128 in the illustrated embodiment is contemplated to be connected to the table support pivot 64, which slides along the extension 114. As in the prior embodiment, the retraction mechanism 128 is biased so that the table support pivot 64 (and, therefore, the table surface 56) is in the retracted position. As before, the retracted position is the default position that is illustrated in FIG. 13. So that the table surface 56 will remain in a deployed position selected be the passenger in the seat 32, a locking mechanism 130 is provided adjacent to the arm pivot 52.

It is noted that the passenger in the passenger seat 32 may select a deployment position for the table surface 56 at any point between the fully retracted position and the fully deployed position. If the locking mechanism 130 is not activated, the table surface 56 will automatically default to the retracted position.

As noted above, one aspect of the present invention is to assure that the exit passageway 86 in front of the passenger seat 32 remains unobstructed, especially in the event of an emergency that would require access to the door 88. It is for this reason, among others, that the retraction mechanism 128 defaults to a retracted position unless the locking mechanism 130 is engaged. As discussed in greater detail with respect to FIGS. 19-20, the locking mechanism 130 is available to be actuated only when the seat 32 is occupied. If the seat 32 is not occupied, a person is not able to deploy the table surface 56.

The retraction mechanism 128 may include any of a number of different devices for its operation. It is contemplated, for example, that the retraction mechanism 128 may be a pneumatic damper. Alternatively, the retraction mechanism 128 may be a hydraulic damper. Still further, it is contemplated that the retraction mechanism 128 may be a spring. The retraction mechanism 128 also may be a servo motor or a solenoid, as desired. As should be apparent from the foregoing, the exact construction and operation of the retraction mechanism 128 is not critical to the operation of the present invention.

Similarly, the locking mechanism 130 may be constructed in any of a number of different ways without departing from the scope of the present invention. The locking mechanism 130 may be an electrical switch, a mechanical switch, or an electro-mechanical switch, as should be apparent to those skilled in the art.

In addition, the exact position of the locking mechanism 130, while shown adjacent to the arm pivot 52, is not critical to the operation of the present invention. The locking mechanism 130 may be placed at any suitable location without departing from the scope of the present invention. While it is contemplated that the locking mechanism 130 will be located somewhere on the structure of the exit row table 112, the locking mechanism 130 may be positioned remotely (e.g., on the arm rest 38) without departing from the scope of the present invention.

In connection with the embodiments described in connection with FIGS. 10-15, it is noted that features from any of the three embodiments of the exit row table 84, 104, 112 may be combined without departing from the scope of the present invention. For example, the exit row table 112 may incorporate the retraction mechanism 120 in connection with the arm pivot 52. The same retraction mechanism 120 may be provided in the same location for the exit row table 104. Furthermore, the retraction mechanisms 120, 124, 128 from all three embodiments may be combined into a single table without departing from the scope of the present invention.

Figure 19:
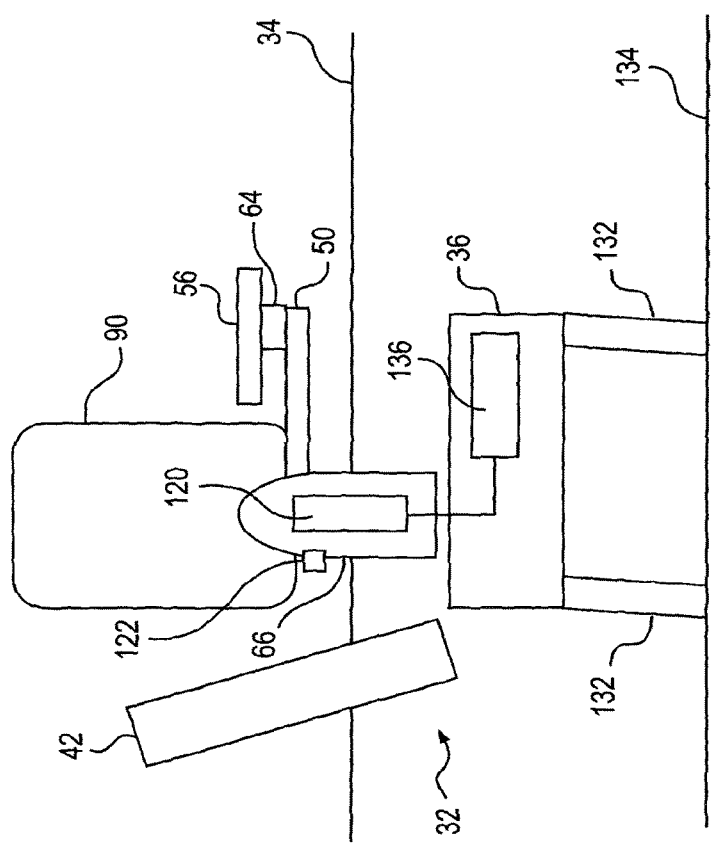
FIG. 19 is a graphical, side view of the exit row table and some of the associated components that are illustrated for the first, second, and third embodiments of the exit row table according to the present invention.

FIG. 19 is a graphical side view of a passenger seat 32 with the exit row table 84 illustrated in FIGS. 10-11. It is noted that FIG. 19 is equally illustrative of the other exit row tables 30, 104, 112. As illustrated in FIG. 19, for context, the seat 32 is disposed on legs 132 that are connected to the floor 134 of the aircraft 10.

A seat sensor 136 is disposed in the seat 32, for example within the seat cushion 36, and is operatively connected to the retraction mechanism 120 associated with the exit row table 84. The seat sensor 136 is contemplated to be a weight sensor that detects if a sufficiently large amount of weight is present in the seat 32. If the weight on the seat 32 exceeds a predetermined amount, the seat sensor 136 provides a signal to the retraction mechanism 120 or the locking mechanism 122 to permit locking of the table surface 56 in a preselected position.

It is noted that the seat sensor 136 need not be a weight sensor. It is contemplated that the seat sensor 136 may include one or more sensors that operate independently or together with one another to measure parameters indicative of a person being seated in the passenger seat 32. Weight is only one variable that may be detected.

Figure 20:
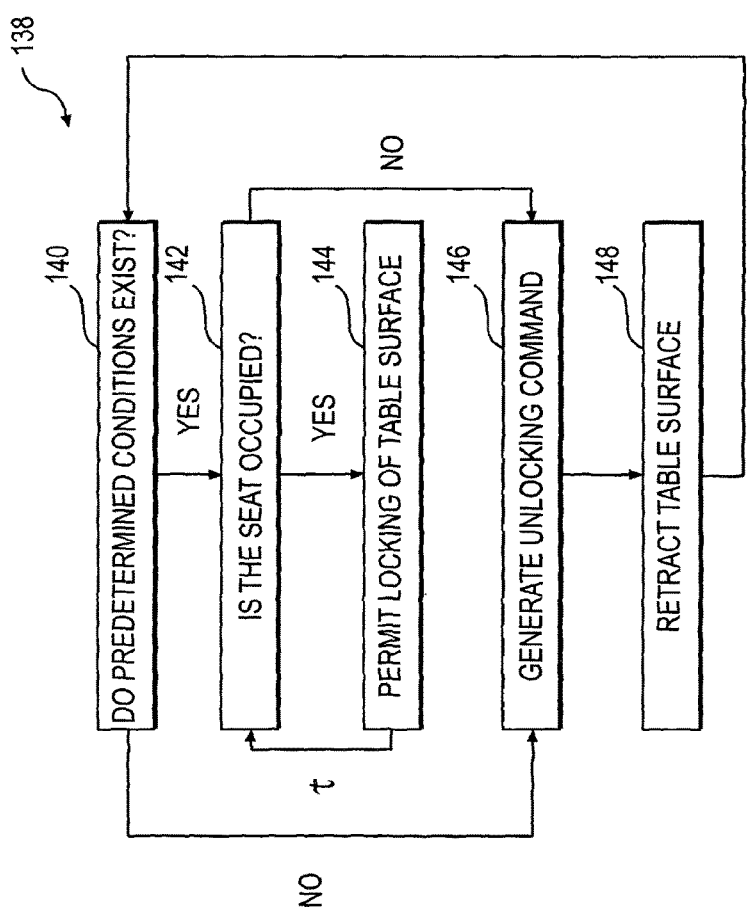
FIG. 20 is a flow chart depicting aspects of one method contemplated for operation of the exit row table of the present invention.

FIG. 20 provides a flow chart that illustrates one contemplated method for the operation of the exit row table 30, 84, 104, 112 of the present invention. As noted above, the exit row table 30, 84, 104, 112 is biased into a retracted condition (after having been removed from the stowage location in the sideboard 34) such that the leading edge 98 of the table surface 56 does not extend between the boundaries 100, 102 of the exit passageway 86. For the table surface 56 to be lockable in a deployed position, at least two conditions must be met: (1) there must be a person seated in the seat 32, and (2) the flight condition of the aircraft 10 must permit deployment of the table surface 56.

As for the first condition, as noted above, a seat sensor 136 is provided in the passenger seat 32. The seat sensor 136 is contemplated to sense if a sufficient amount of weight is present on the seat. In other words, the seat sensor 136 provides a weight signal. If the weight signal exceeds a predetermined minimum, then the first condition is satisfied.

The second condition may be satisfied by any of a number of different inputs that are available on board the aircraft 10. It is contemplated that the second condition is satisfied when the aircraft is not in a taxi, takeoff, and landing ("TTL") mode of operation. During flight, it is contemplated that the second condition is satisfied when the aircraft 10 is not experiencing turbulence or other conditions where retraction of the table surface 56 is desirable.

In the discussion that follows, it is contemplated that the first condition is satisfied when a weight in excess of a predetermine amount is present in the seat 32. The second condition is considered to be satisfied when the aircraft is not in a TTL mode of operation.

FIG. 20 illustrates the iterative nature of the method of operation of the exit row table 30, 84, 104, 112 of the present invention.

The method 138 begins at step 140 where the method 138 enquires if predetermined conditions exist on board the aircraft 10. Specifically, the method 138 determines if the aircraft 10 is in a flight mode of operation (i.e., a non-TTL mode of operation). If the method 138 determines that predetermined conditions exist and that the aircraft 10 is not in a TTL mode of operation, then the method 138 proceeds to step 142. If the method 138 determines that predetermined conditions do not exist, this means that the aircraft 10 is no longer in a flight mode and that the aircraft 10 is preparing for taxi, takeoff, and landing. As a result, the method 138 proceeds to step 146 where an unlocking command is generated. The unlocking command causes the exit row table 30, 84, 104, 112 to return to the retracted condition.

After determining that predetermined conditions exist on the aircraft 10 suitable for deployment of the exit row table 30, 84, 104, 112, the method 138 proceeds to step 144, where the method 138 determines if the seat 32 is occupied. If the seat is occupied, the method 138 proceeds to step 144 where locking of the exit row table 30, 84, 104, 112 in a deployed condition is permitted. If the seat 32 is not occupied, the method 138 proceeds to step 146, where the unlocking command is generated.

As should be apparent, when the unlocking command is generated at step 146, the method proceeds to step 148 where the table surface 56 is retracted. If the table surface 56 is not deployed, then retraction of the table surface 56 is not necessary, since the table surface 56 automatically biases to the retracted condition, as discussed above.

With continued reference to FIG. 20, it is noted that steps 142 and 144 of the method 138 may be repeated after a periodic time period t. As such, the method 138 may detect if a person has left the seat 32 and moved to another location on the aircraft 10. If so, the method 138 is designed to detect this change and retract the exit row table 30, 84, 104, 112.

Similarly, the entirety of the method 138 may be executed periodically for the same reason. As such, if the conditions on board the aircraft 10 change, the exit row table 30, 84, 104, 112 will be retracted.

Figure 21:
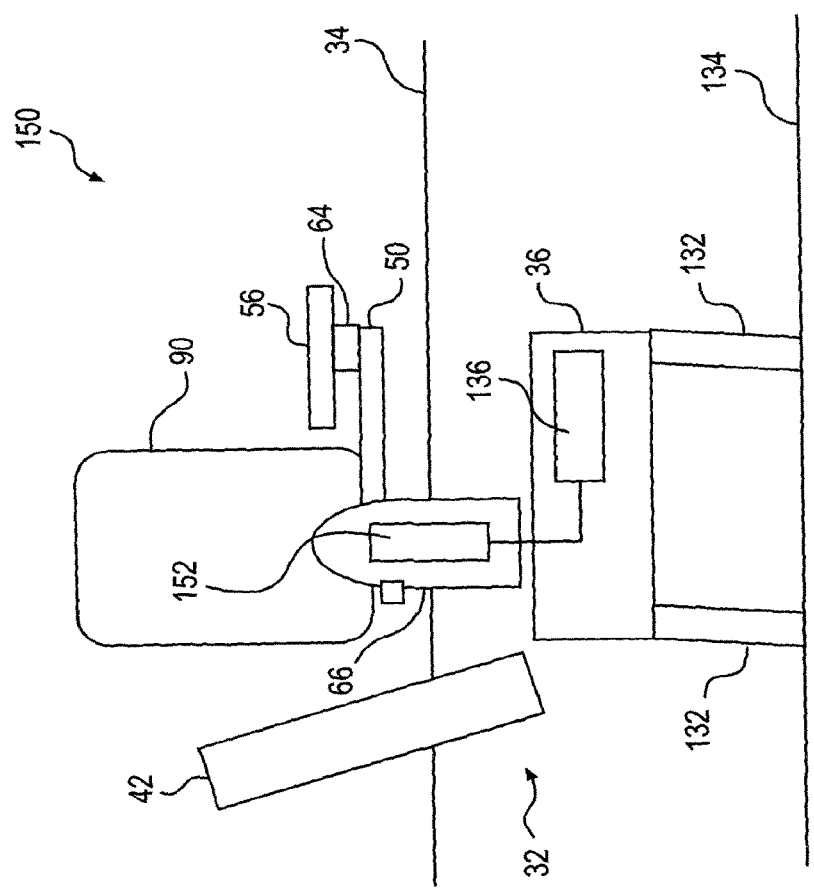
FIG. 21 is a graphical side view of another embodiment of an exit row table according to the present invention.

FIG. 21 illustrates one additional embodiment contemplated of an exit row table 150 according to the present invention. In this embodiment, the exit row table 150 excludes a locking mechanism 122. Instead, the exit row table 150 is provided with a combined holding and retraction mechanism 152. The holding and retraction mechanism 152 in contemplated to combine the functionality of the locking mechanism 122 and the retraction mechanism 120 illustrated in FIG. 19. As should be apparent, this embodiment also may be considered to combine the locking mechanisms and the retraction mechanisms of others of the embodiments described herein.

In operation, the exit row table 150 is contemplated to function as follows. When a passenger is seated in the seat 32 and actuates the seat sensor 136, the holding and retraction mechanism 152 permits the passenger to position the table surface 56 in any suitable location. The table surface 56, however, is not locked in the position. Instead, the table surface 56 is maintained in the position selected by the passenger. In this embodiment, it is contemplated that the table surface 56 is freely movable to any position between a retracted position and a deployed position without locking the table in a fixed position. Any suitable mechanism, as should be apparent to those skilled in the art may be employed without departing from the scope of the present invention.

When the passenger gets up from the seat 32 and, thereby alters the input to the seat sensor 136, it is contemplated in one embodiment that the holding and retraction mechanism 152 will retract the table surface 56 to a retracted position. Alternatively, if the flight conditions of the aircraft 10 require that the table surface 56 be in a retracted position, the holding and retraction mechanism 152 will retract the table surface 56 to the retracted position and prevent positioning of the table surface at any position between the retracted position and the deployed position.

Figure 22:
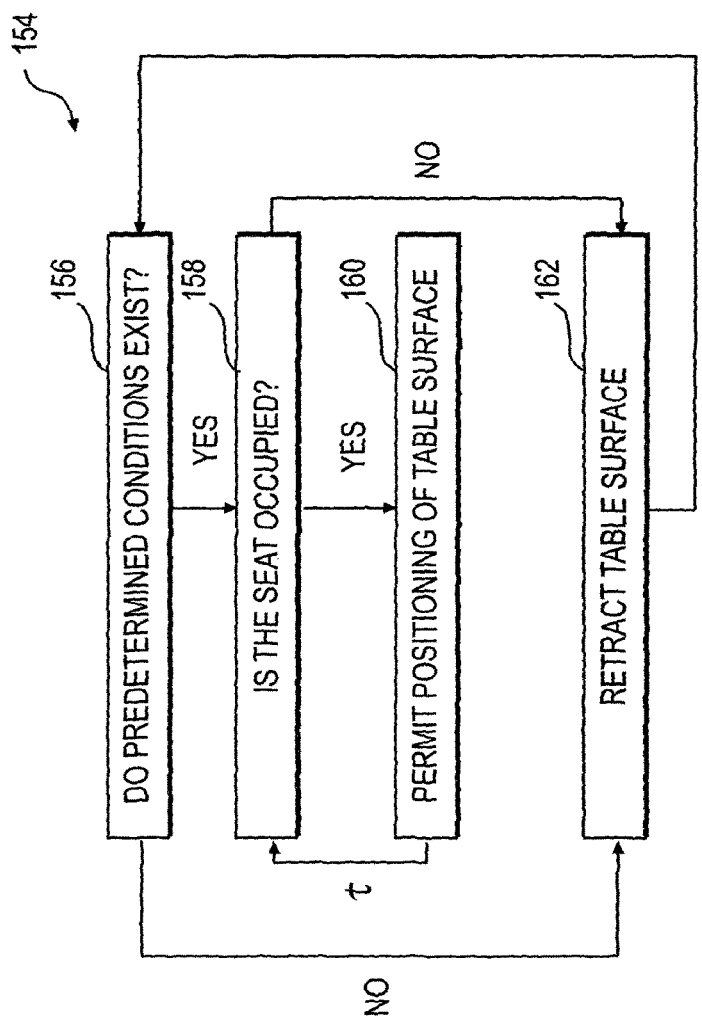
FIG. 22 is a flow chart depicting aspects of a method contemplated for operation of the exit row table illustrated in FIG. 21.

FIG. 22 is a flow chart illustrating the steps of a method 154 of operation contemplated for the exit row table 150 illustrated in FIG. 21. This method 154 is similar to the method 138 illustrated in FIG. 20, except that the locking aspect of that method 138 has been removed consistent with the construction of the exit row table 150.

As illustrated, the method 154 starts at a step 156 where the method determines if predetermined flight conditions exist. As noted above, the predetermined conditions include conditions where the aircraft 10 is not in a TTL mode of operation or experiencing turbulence, for example. The method 154 proceeds to step 158, where the method 154 determines if the seat 32 is occupied. If so, the table surface may be positioned in accordance with step 160. If the seat is not occupied, the method 154 proceeds to step 162, where the table surface 56 is retracted. In one alternative embodiment, if the predetermined conditions for the flying of the aircraft 10 do not exist (i.e., the aircraft 10 is in a TTL mode of operation), the table surface 56 is retracted as indicated in step 162. In yet another alternative embodiment, it is contemplated that the table surface 56 will remain in the deployed position even if the seat 32 is not occupied but the aircraft 10 is operating such that the predetermined flight conditions do not exist (i.e., the aircraft 10 is in a TTL mode of operation). In all other aspects, the method 154 is considered to be similar to the method 138 as described above.

A should be apparent from the foregoing, it is contemplated that there are two conditions that affect the whether or not the table surface 56 is retracted or deployable. The first condition is the flight condition of the aircraft 10. The second is the occupancy of the seat 32, as measured by the seat sensor 136. Either one or both of these conditions may have an impact on the deployability of the table surface 56. For example, if the aircraft 10 is in a flight mode excluding a TTL mode of operation, for example, this means that the aircraft 10 is in a condition where the table surface 56 may be deployed. It is contemplated, in one mode of operation, that the table surface 56 is deployable when the seat 32 is unoccupied and predetermined flight conditions are met. In a second contemplated mode of operation, the seat 32 must be occupied and the aircraft 10 must meet the predetermined flight criteria for the table surface 56 to be deployable.

While the exit row tables 30, 84, 104, 112, 150 have been discussed in connection with an embodiment for a seat 32 adjacent to an exit passageway 86, it is noted that the exit row tables 30, 84, 104, 112, 150 of the present invention may be used at any location within the aircraft without departing from the scope of the present invention. In other words, the exit row tables 30, 84, 104, 112, 150 may be employed in any location, as should be apparent to those skilled in the art.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. An exit row table, comprising:
   a table surface deployable between a retracted position and a deployed position;
   an arm having a first end and a second end, the arm supporting the table surface at the first end, through an arm pivot;
   a scissor jack connected to the arm via a slide for deploying the arm and table surface between a first position to a second position;
   a support connected to the arm at the second end of the arm, the support being connected to the slide disposed in an aircraft structure interior; and
   a rail for guiding travel of the slide connected to the support through a support pivot allowing the support to pivot from a vertical orientation to a horizontal orientation,
   wherein the scissor jack is connected at a first end thereof to the slide connected to the support, such that the support moves along the rail and the scissor jack is connectable at a second end thereof to at least one of the rail, a frame disposed in the aircraft structure interior, or a portion of an interior of a sideledge of the aircraft.

2. The exit row table of claim 1, wherein the first position is within a compartment and the second position is at least partially exterior to the compartment.

3. The exit row table of claim 1, further comprising an actuator connected to the scissor jack for applying a force on the arm to deploy the arm between the first position and the second position.

4. The exit row table of claim 1, wherein the scissor jack is responsive to a momentary application of a force to deploy the table surface between the first and second positions.

* * * * *